US009615604B2

United States Patent
Russick et al.

(10) Patent No.: US 9,615,604 B2
(45) Date of Patent: Apr. 11, 2017

(54) FOOD WASTE DEHYDRATOR

(71) Applicants: David Russick, Shorewood, MN (US);
John Adams, St. Paul, MN (US);
William Northrup, Minneapolis, MN (US);
Todd Martens, Hopkins, MN (US)

(72) Inventors: David Russick, Shorewood, MN (US);
John Adams, St. Paul, MN (US);
William Northrup, Minneapolis, MN (US);
Todd Martens, Hopkins, MN (US)

(73) Assignee: David Russick, Shorewood, MN (US)

(*) Notice: Subject to any disclaimer, the term of this patent is extended or adjusted under 35 U.S.C. 154(b) by 413 days.

(21) Appl. No.: 14/515,264

(22) Filed: Oct. 15, 2014

(65) Prior Publication Data

US 2015/0216223 A1  Aug. 6, 2015

Related U.S. Application Data

(60) Provisional application No. 61/936,731, filed on Feb. 6, 2014.

(51) Int. Cl.
| *A23N 17/00* | (2006.01) |
| *F26B 19/00* | (2006.01) |
| *F26B 9/06* | (2006.01) |
| *F26B 9/08* | (2006.01) |

(52) U.S. Cl.
CPC .............. *A23N 17/004* (2013.01); *F26B 9/06* (2013.01); *F26B 9/08* (2013.01); *F26B 9/082* (2013.01); *F26B 19/005* (2013.01); *F26B 2200/02* (2013.01)

(58) Field of Classification Search
CPC . A23N 17/004; F26B 9/06; F26B 9/08; F26B 9/082; F26B 19/005; F26B 2200/02
See application file for complete search history.

(56) References Cited

U.S. PATENT DOCUMENTS

| 318,543 | A |   | 5/1885  | Collins |
| 2,359,199 | A |   | 9/1944  | Burnett |
| 2,448,144 | A |   | 8/1948  | Guthier |
| 2,534,648 | A | * | 12/1950 | Wilbur ...................... A23L 5/57 |
|           |   |   |         | 426/510 |
| 2,850,809 | A |   | 9/1958  | Lamb |
| 3,257,737 | A |   | 6/1966  | Thomas |
| 3,264,753 | A |   | 8/1966  | Budzien |
| 3,943,842 | A |   | 3/1976  | Bills |

(Continued)

OTHER PUBLICATIONS

Gaiarecycle, LLC; Technology Overview; 2010; http://gaiarecycle.com/tech.php?id=8.

(Continued)

*Primary Examiner* — Christopher Kim
(74) *Attorney, Agent, or Firm* — Adams Grumbles, LLP; Brittany Nanzig

(57) ABSTRACT

A food waste dehydrator that can efficiently collect food scraps and food waste and create an output that can be used as livestock feed, livestock feed supplement, or can be further processed into compost or soil amendment. In some embodiments, the food waste dehydrator is mobile and modular. In some embodiments, the food waste dehydrator includes a self-contained heating and energy source.

19 Claims, 33 Drawing Sheets

(56) References Cited

U.S. PATENT DOCUMENTS

| | | | |
|---|---|---|---|
| 3,955,488 | A | 5/1976 | Wheeler |
| 4,036,562 | A | 7/1977 | Barnes |
| 4,074,868 | A | 2/1978 | Link |
| 4,110,916 | A | 9/1978 | Bemrose |
| 4,135,308 | A * | 1/1979 | Benson ............... F26B 3/205 34/128 |
| 4,143,592 | A | 3/1979 | Kuest |
| 4,150,617 | A | 4/1979 | Schramm |
| 4,150,795 | A | 4/1979 | Link |
| 4,155,299 | A | 5/1979 | Tuttle |
| 4,190,965 | A | 3/1980 | Erickson |
| 4,192,081 | A | 3/1980 | Erickson |
| 4,221,059 | A | 9/1980 | Everitt |
| 4,224,743 | A | 9/1980 | Erickson |
| 4,236,063 | A | 11/1980 | Glucksman |
| 4,249,701 | A | 2/1981 | Miller |
| 4,266,472 | A | 5/1981 | Reale |
| 4,329,789 | A | 5/1982 | Erickson |
| 4,352,249 | A | 10/1982 | Rose |
| 4,380,127 | A | 4/1983 | Roberts |
| 4,531,306 | A | 7/1985 | Erickson |
| 4,534,118 | A | 8/1985 | Cabus et al. |
| 4,536,643 | A | 8/1985 | Erickson |
| 4,592,150 | A * | 6/1986 | Schnupp ............. A23N 12/10 34/136 |
| 4,606,262 | A | 8/1986 | Robinson |
| 4,630,780 | A | 12/1986 | Immel |
| 4,651,636 | A | 3/1987 | Fields |
| 4,707,370 | A | 11/1987 | Kakis |
| 4,939,346 | A * | 7/1990 | Bailey ................ F26B 17/20 219/388 |
| 5,119,571 | A | 6/1992 | Beasley |
| 5,209,821 | A | 5/1993 | Shaw |
| 5,235,906 | A | 8/1993 | Hsu |
| 5,311,673 | A | 5/1994 | Su |
| 5,346,714 | A | 9/1994 | Peters |
| 5,423,249 | A | 6/1995 | Meyer |
| 5,437,108 | A | 8/1995 | Alseth |
| 5,451,004 | A | 9/1995 | Altonji et al. |
| 5,454,298 | A | 10/1995 | Lu |
| 5,569,605 | A | 10/1996 | Teramachi et al. |
| 5,577,674 | A | 11/1996 | Altonji et al. |
| 5,826,498 | A | 10/1998 | Su |
| 5,878,508 | A | 3/1999 | Knoll et al. |
| 5,948,674 | A | 9/1999 | Mankiewica |
| 5,950,526 | A | 9/1999 | Hsu |
| 5,960,560 | A | 10/1999 | Stoll |
| 5,974,957 | A | 11/1999 | Ysen |
| 6,041,696 | A | 3/2000 | Su |
| 6,085,442 | A | 7/2000 | Erickson |
| 6,090,423 | A * | 7/2000 | Wetzel ................. A23L 5/15 34/499 |
| 6,195,906 | B1 | 3/2001 | Stoll |
| 6,220,150 | B1 | 4/2001 | Margolis |
| 6,233,844 | B1 | 5/2001 | Juarez et al. |
| 6,581,297 | B1 | 6/2003 | Ginder |
| 6,729,753 | B2 | 5/2004 | Artman |
| 6,772,534 | B2 | 8/2004 | Gomes |
| 6,796,223 | B2 | 9/2004 | Jiang |
| 6,808,732 | B2 | 10/2004 | Boullin |
| 6,895,687 | B2 | 5/2005 | Resch |
| 6,931,756 | B2 | 8/2005 | Morgan |
| 7,029,716 | B2 | 4/2006 | Margolis |
| 7,074,444 | B2 | 7/2006 | Margolis |
| 7,343,699 | B2 | 3/2008 | Svonja |
| 7,360,321 | B2 | 4/2008 | Su |
| 7,665,601 | B2 | 2/2010 | Portier |
| 7,883,040 | B2 | 2/2011 | Lee |
| 8,028,536 | B2 | 10/2011 | Morgan |
| 8,152,084 | B2 | 4/2012 | Lee |
| 8,171,845 | B2 | 5/2012 | Hartsfield |
| 8,342,436 | B2 | 1/2013 | Sim |
| 8,412,383 | B2 | 4/2013 | Moretto |
| 2002/0040643 | A1 | 4/2002 | Ware |
| 2002/0166461 | A1 | 11/2002 | Johnson |
| 2005/0144805 | A1 | 7/2005 | Masset |
| 2005/0160620 | A1 | 7/2005 | Morgan |
| 2006/0083828 | A1 | 4/2006 | Lena |
| 2006/0112584 | A1 | 6/2006 | Jones |
| 2006/0286234 | A1 | 12/2006 | Tsai |
| 2007/0275142 | A1 | 11/2007 | Kobussen et al. |
| 2008/0274263 | A1 | 11/2008 | Mazin |
| 2009/0025248 | A1 | 1/2009 | Lannon |
| 2009/0110794 | A1 | 4/2009 | Peters |
| 2009/0136637 | A1 | 5/2009 | Janssen |
| 2009/0211274 | A1 | 8/2009 | Meng |
| 2010/0086659 | A1 * | 4/2010 | Schmidt ............... A23B 4/0053 426/471 |
| 2010/0206182 | A1 * | 8/2010 | Iwamoto ............... A23N 15/00 99/469 |
| 2010/0218395 | A1 | 9/2010 | Durance |
| 2011/0061258 | A1 | 3/2011 | Kim |
| 2011/0078915 | A1 | 4/2011 | Kim |
| 2011/0086145 | A1 | 4/2011 | Rodriguez Campisto |
| 2011/0155567 | A1 | 6/2011 | Sim |
| 2011/0283895 | A1 | 11/2011 | Veltrop |
| 2012/0034354 | A1 | 2/2012 | Board |
| 2012/0039757 | A1 | 2/2012 | Yoo |
| 2012/0067069 | A1 | 3/2012 | Wells |
| 2012/0073454 | A1 | 3/2012 | Kobussen et al. |
| 2012/0104129 | A1 | 5/2012 | Park |
| 2012/0137898 | A1 | 6/2012 | Alipour |
| 2012/0177796 | A1 | 7/2012 | Poulsen |
| 2012/0207889 | A1 | 8/2012 | Margolis |
| 2012/0227279 | A1 | 9/2012 | Dewald |
| 2012/0228088 | A1 | 9/2012 | Johnson |
| 2012/0237638 | A1 | 9/2012 | Mazin |
| 2012/0285659 | A1 | 11/2012 | Sim |
| 2012/0324756 | A1 | 12/2012 | Fux |
| 2013/0000143 | A1 | 1/2013 | Fux |
| 2013/0026760 | A1 | 1/2013 | Lee |
| 2015/0059594 | A1 * | 3/2015 | Pastusek ............... A23N 17/004 99/468 |

OTHER PUBLICATIONS

Somat Company; Somat DeHydrator System; Copyright 2011; http://somatcompany.com/Products/Dehydrator-System/.

Barthold Recycling, Inc.; .:Barhold Recycling, Inc—A Network of Family Farms that Recycle Food :.; 1988; http://www.bartholdrecycling.com/site/about.htm.

P.A. Caton, M.A. Carr, S.S. Kim, M.J. Beautyman; Energy recovery from waste food by combustion or gasification with the potential for regenerative dehydration: A case study; Energy Conversion and Management; Jan. 27, 2010; 1157-1169; vol. 51; U.S.A.

* cited by examiner

FIG. 13
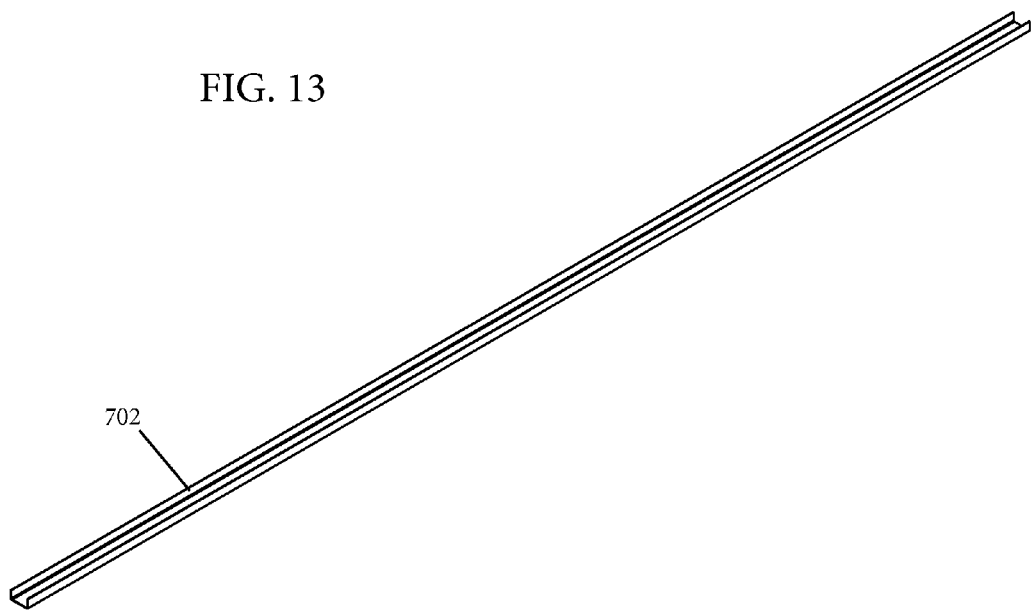
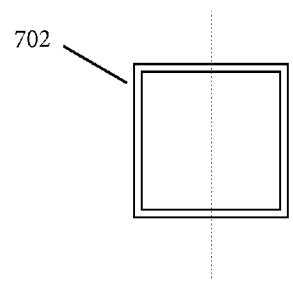

FIG. 22
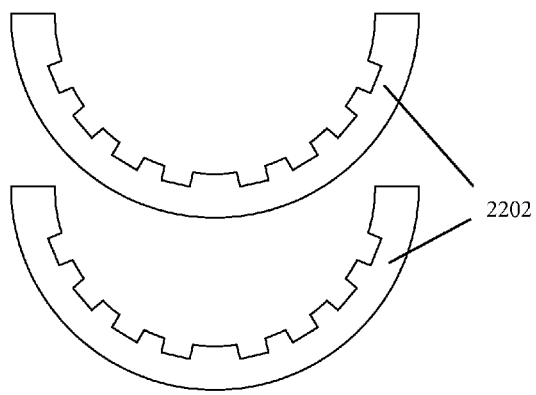
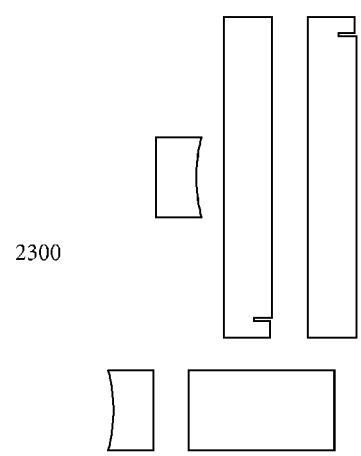
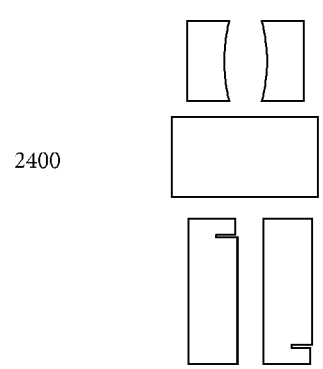

FIG. 23
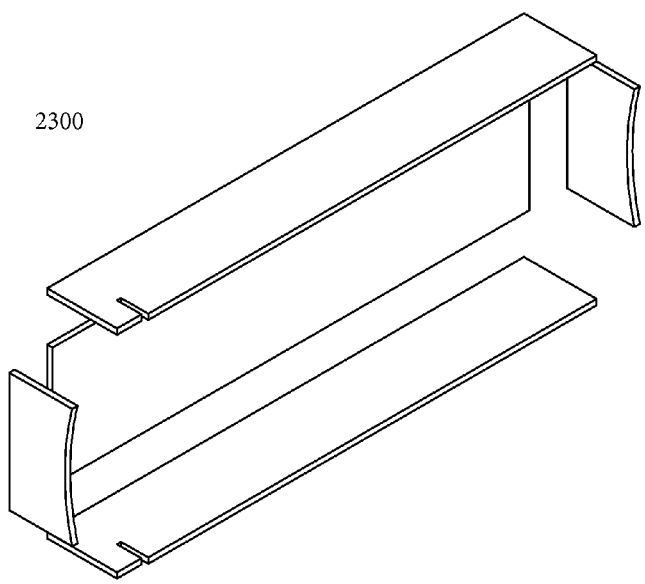
2300
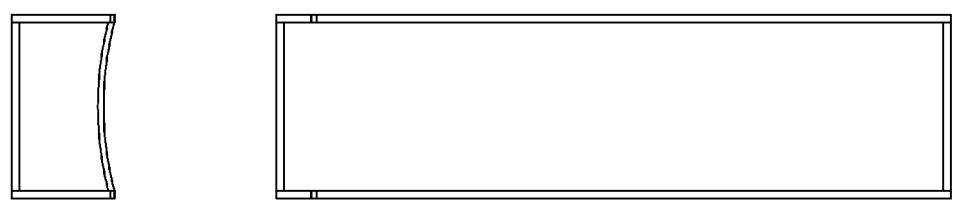
2300

FIG. 24
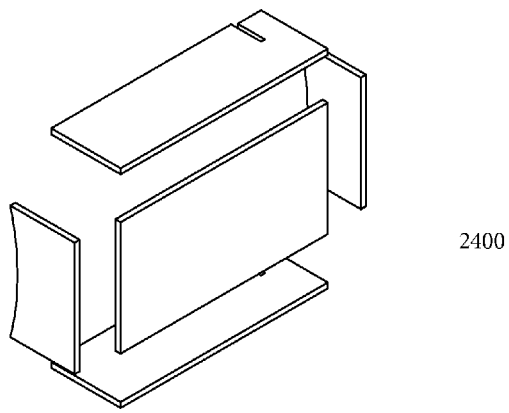
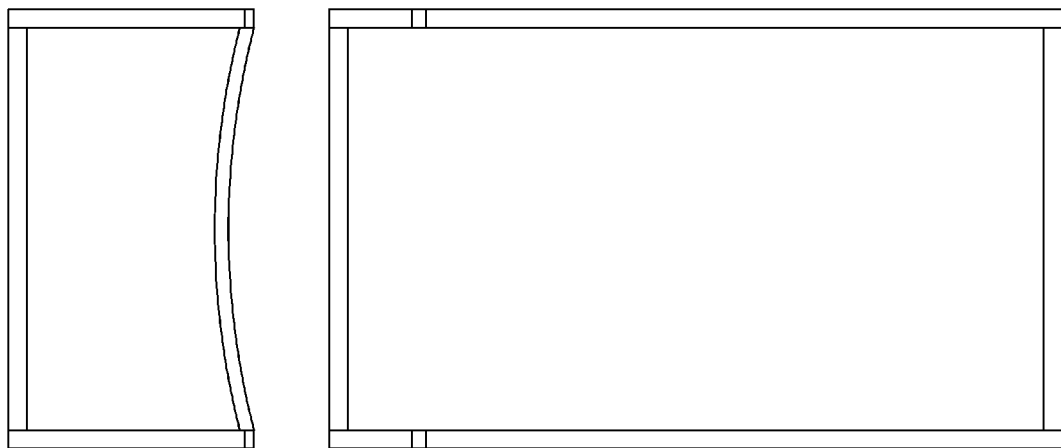

FIG. 26a  FIG. 26b
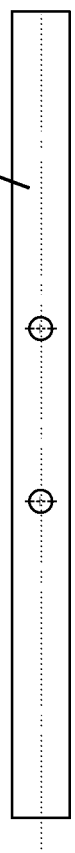
2504
FIG. 26c
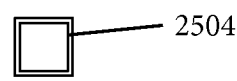 2504

FIG. 31
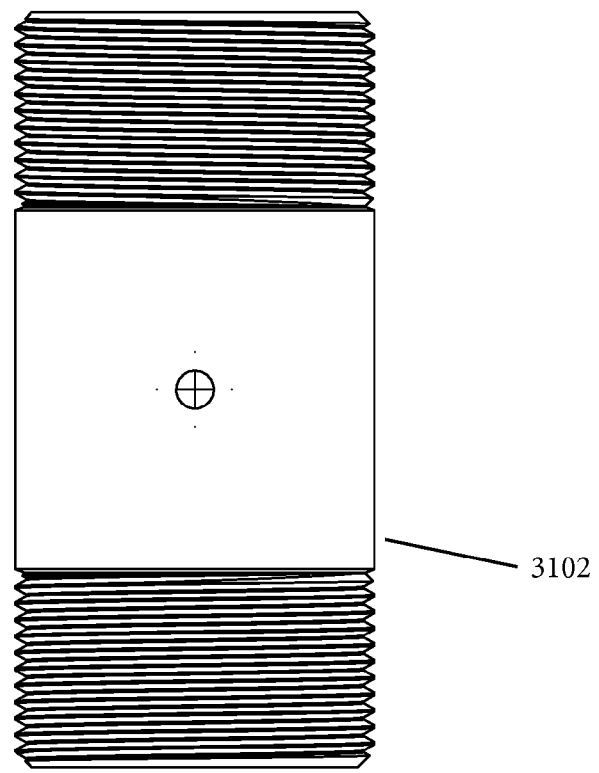
3102
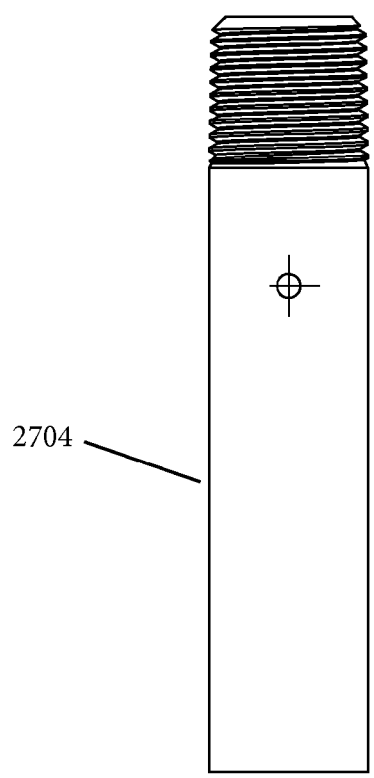
2704

FOOD WASTE DEHYDRATOR

CROSS-REFERENCE TO RELATED APPLICATION

This application claims the benefit of U.S. Provisional Application No. 61/936,731, filed Feb. 6, 2014, titled FOOD WASTE DEHYDRATOR.

FIELD OF THE DISCLOSURE

The present invention generally relates to a food waste dehydrator. More specifically, it relates to a mobile and modular device that can accept food scraps and food waste, dehydrate the food, and create a usable output such as livestock feed or compost.

BACKGROUND OF THE INVENTION

Currently, when establishments such as restaurants, schools, hotels, and food processing plants have food waste, they dispose of it in dumpsters along with other garbage. Garbage trucks then come and pick up the trash and haul it to landfills, where the food waste remains until it is degraded. However, there are many more uses for such food waste. The general order of preference for reuse of food according to the United States Environmental Protection Agency is: first, for human consumption, provided the food is in a suitable condition for human consumption; second, reuse for livestock feed; third, for use as compost; fourth, for anaerobic digestion; and fifth, for garbage landfills. A better method of disposing of food waste is needed that enables the food waste to be re-used in a productive manner.

SUMMARY

The present disclosure relates to a food waste dehydrator that can include a self-contained heating and energy source and can be mobile and modular. The device is designed for efficient collection and processing of food scraps and food waste. It is meant to be transportable on a trailer or vehicle and can also be modular, wherein a full dehydration tank can be rolled off the trailer or vehicle and another empty tank can be loaded on to the trailer or vehicle to collect additional food scraps and food waste.

Reference is made throughout the present disclosure to certain aspects of various embodiments of the food waste processor described herein. Such references to aspects of the presently described device do not limit the scope of the claimed invention. Additionally, any examples set forth in this disclosure are not intended to be limiting and merely set forth some of the many possible embodiments for the disclosed food waste dehydrator device. It is to be understood that the phraseology and terminology used herein are for the purpose of description and should not be regarded as limiting.

BRIEF DESCRIPTION OF THE DRAWINGS

FIG. 13 illustrates a channel of the disclosed dehydrator of FIG. 4.

FIG. 22 illustrates tank supports, hinge mount parts, and latch mount parts of the disclosed dehydrator of FIG. 4.

FIG. 23 illustrates an exploded view of the hinge mount of the disclosed dehydrator of FIG. 4.

FIG. 24 illustrates an exploded view of the latch mount of the disclosed dehydrator of FIG. 4.

FIG. 26a illustrates a front view of the front tab of the shaft support brace of the disclosed dehydrator of FIG. 4.

FIG. 26b illustrates a top view of the front tab of the shaft support brace of the disclosed dehydrator of FIG. 4.

FIG. 26c illustrates side view of the front tab of the shaft support brace of the disclosed dehydrator of FIG. 4.

FIG. 31 illustrates connection parts for various connection pieces of the disclosed dehydrator of FIG. 4.

DETAILED DESCRIPTION

Figure 1:
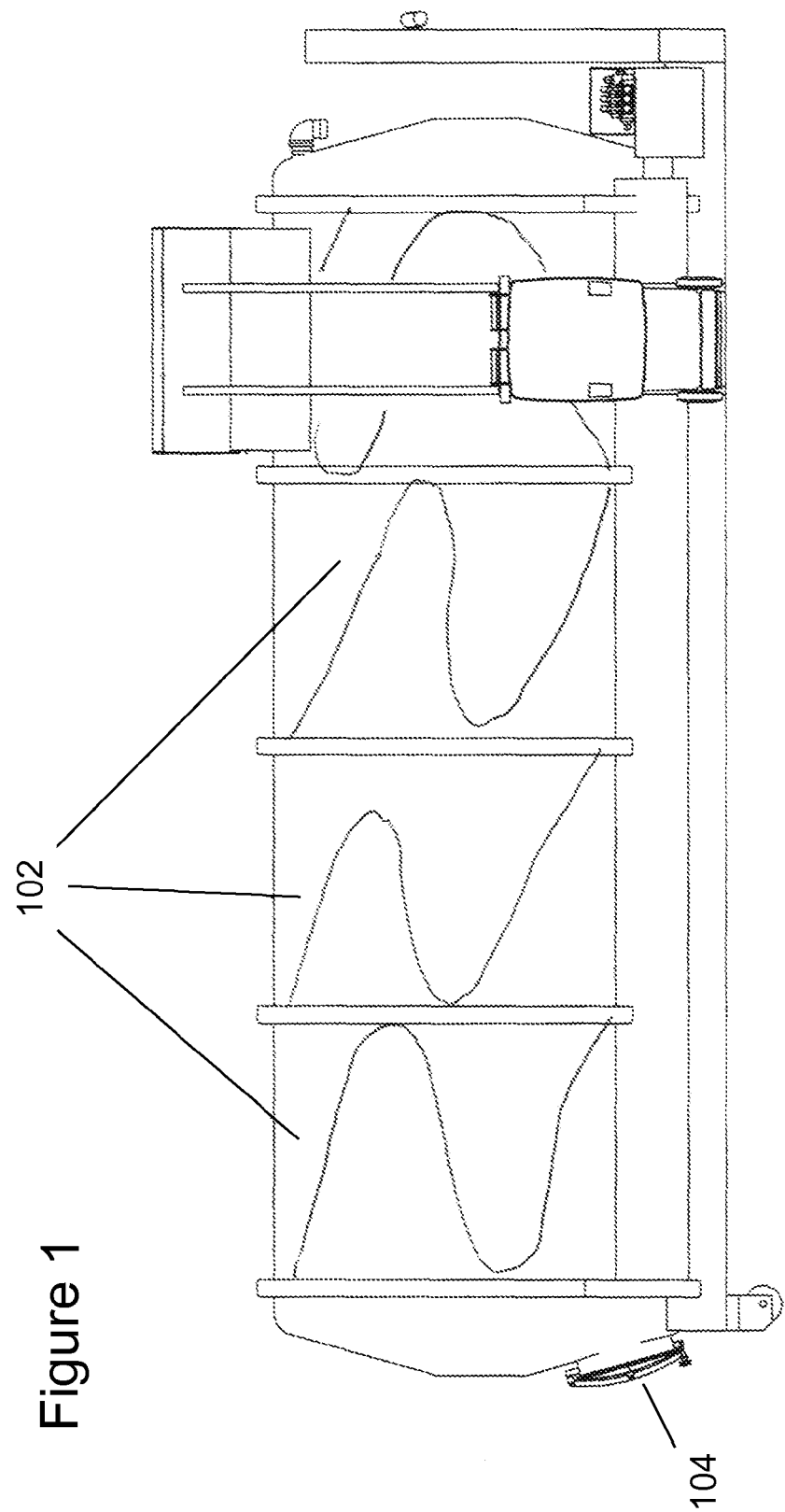
FIG. 1 is a left side view of one embodiment of the disclosed dehydrator and illustrates heating coils wrapped around the outside of the interior shell of the tank and also illustrates an evacuation port.

Various embodiments will be described in detail with reference to the drawings, wherein like reference numerals represent like parts and assemblies throughout the several views. Reference to various embodiments does not limit the scope of the claimed invention. Additionally, any examples set forth in this specification are not intended to be limiting and merely set forth some of the many possible embodiments for the described invention. It is understood that various omissions and substitutions of equivalents are contemplated as circumstances may suggest or render expedient, but these are intended to cover applications or embodiments without departing from the spirit or scope of the claimed invention. Also, it is to be understood that the phraseology and terminology used herein are for the purpose of description and should not be regarded as limiting.

The presently disclosed device is a food waste dehydrator that can efficiently collect food scraps and food waste and create an output that can be used as livestock feed, livestock feed supplement, or can be further processed into compost or soil amendment. While examples provided herein refer to food scraps and food waste, any material capable of being dehydrated can be processed using the presently disclosed device.

Figure 4:
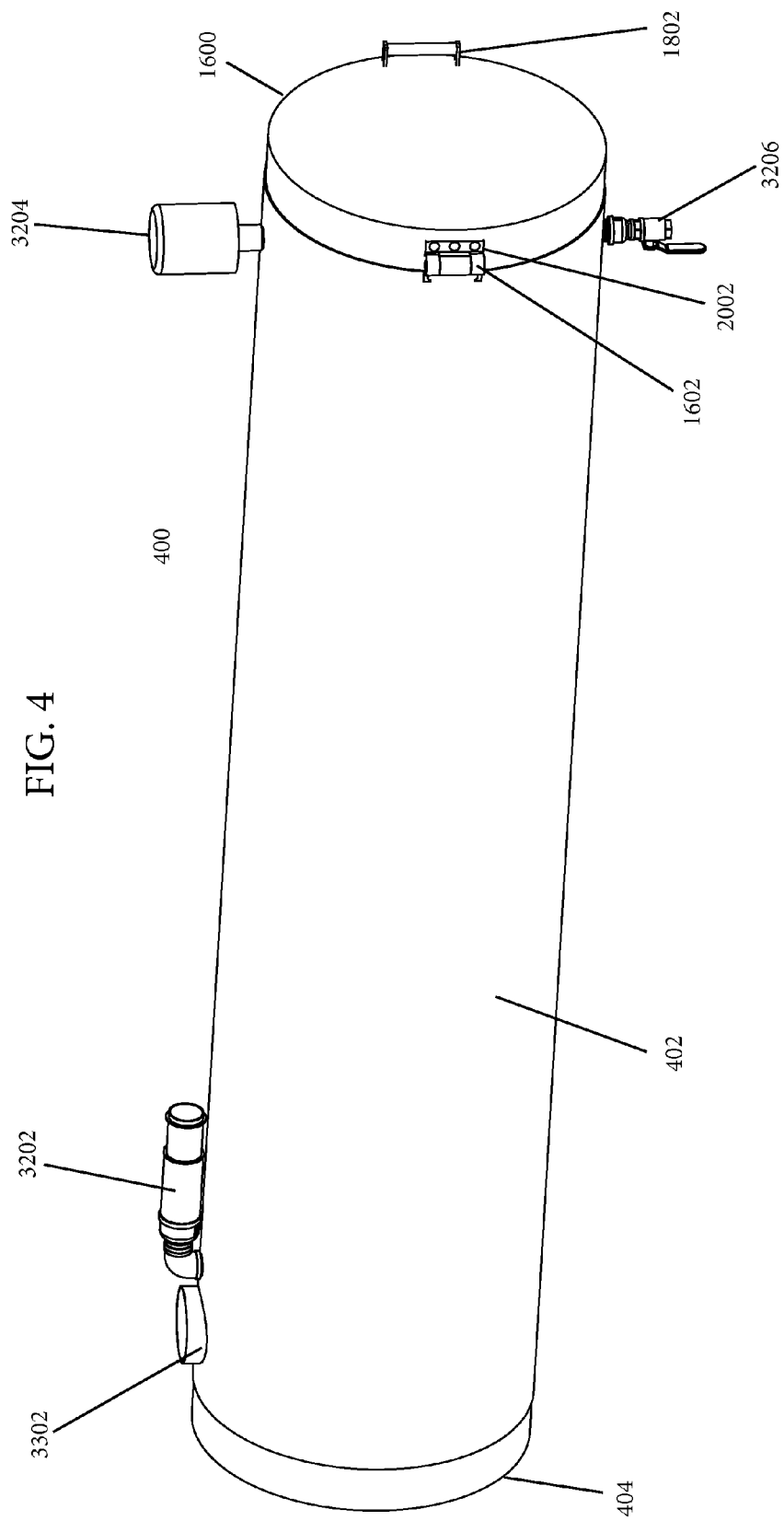
FIG. 4 illustrates a perspective left side view of the outside of one embodiment of the disclosed dehydrator.

In one embodiment, the main part of the device roughly resembles a cylindrical tank, as illustrated in FIGS. 1 and 4, and has an exterior shell, insulation beneath the exterior shell, a temperature control mechanism on the outside of an interior shell, and a stainless steel internal shell that physically separates the temperature control mechanism from the food scraps and food waste. In one embodiment, the temperature control mechanism is comprised of coils 102. In one embodiment, the temperature control mechanism is comprised of direct-fired tube heaters on the sides of the tank. The size of the dehydrator tank can range in capacity from 200 gallons to 9,000 gallons. The exterior shell, depicted in FIG. 5, can be made of a metal such as, but not limited to, aluminum, steel, or stainless steel, and serves to keep the insulation safe from environmental elements such as air, wind, precipitation, and UV rays. The insulation between the exterior shell and the temperature control mechanism can be made of a variety of different types of insulation such as, but not limited to, ceramic insulation or foam spray insulation.

In one embodiment, the tank can contain at least one auger 302 on the inside of the tank that agitates, mixes, macerates, and cuts the food scraps and food waste. As the food scraps and food waste are agitated, mixed, macerated, and cut into smaller pieces, air and heat can be more evenly applied, thus allowing for a faster drying period.

In one embodiment, the dehydrator tank has an evacuation tube 3206 at the bottom of the tank that can collect moisture and water during the dehydration process. The moisture and water can exit the tank through the evacuation tube 3206 and, in some embodiments, can run directly into the city's sewage system. In other embodiments, the moisture and water can be collected and subjected to further processing.

In one embodiment, the dehydrator tank can have a blower 3202 or vent at the top of the tank to release vapors. Additionally, the dehydrator tank can have a fan near the vent that can blow the vapors out of the main tank and into or near a filter 3204 such as, but not limited to, a carbon filter that will minimize or prevent odor release from the dehydrator.

In one embodiment, the dehydrator tank can have an internal fan that circulates hot air and works in tandem with at least one auger 302 to increase the surface area of the food that is exposed to heated air. This, in turn, can increase the speed at which food scraps and food waste are dehydrated.

Figure 2:
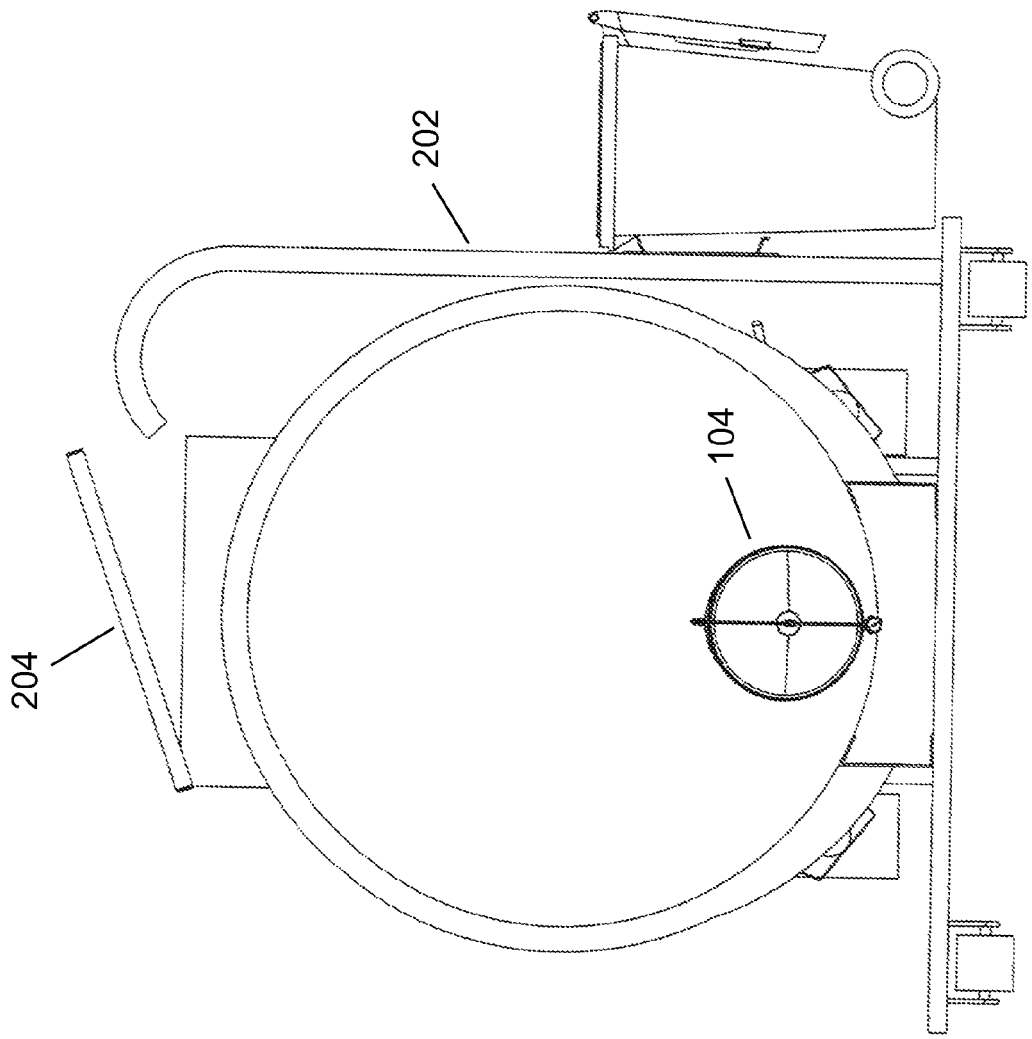
FIG. 2 is a back view of one embodiment of the disclosed dehydrator and illustrates an evacuation port, a dumping device lift, and a top port door.
Figure 3:
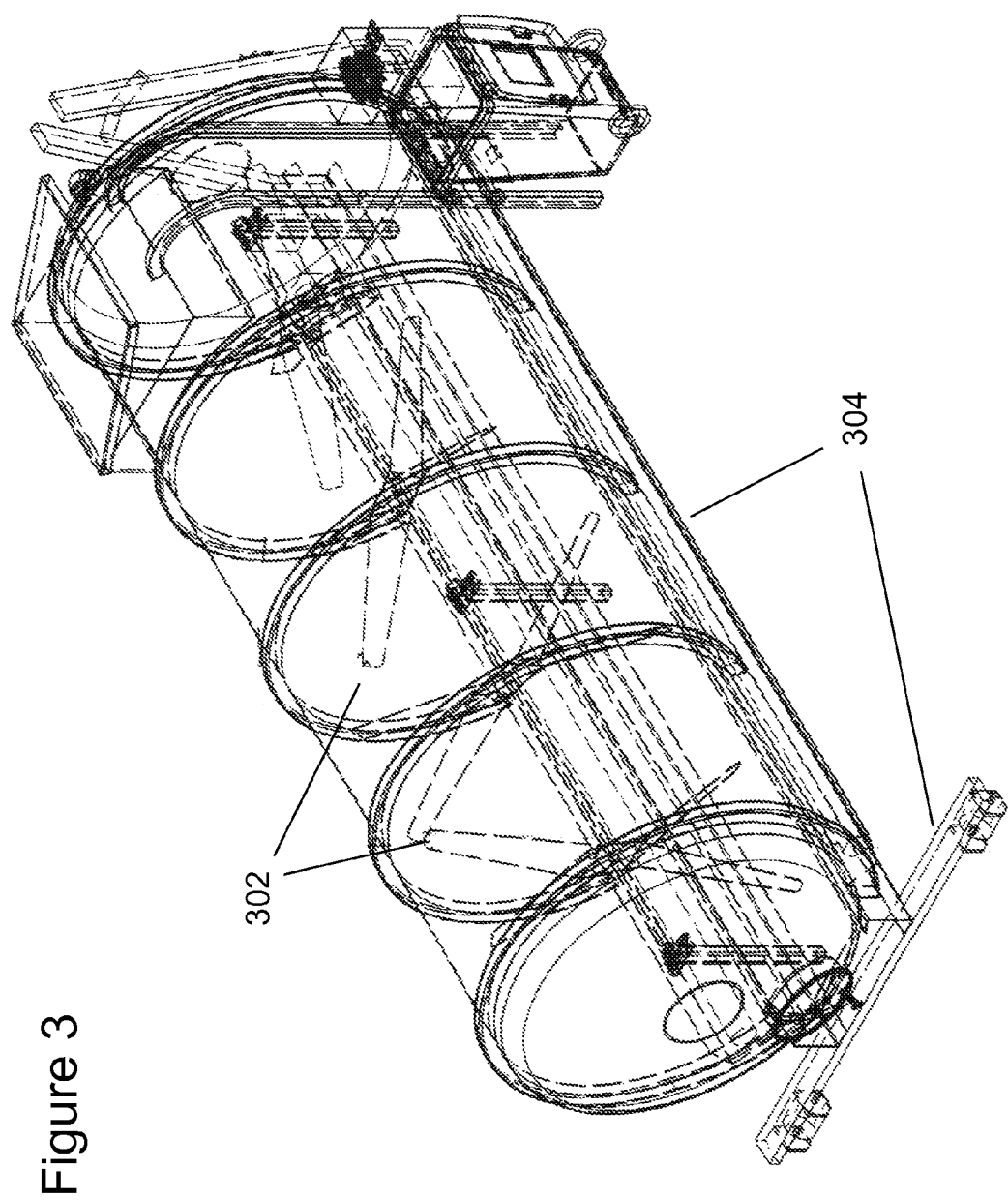
FIG. 3 is a perspective view of one embodiment of the disclosed dehydrator and illustrates a set of internal augers and an external steel frame upon which the invention can be mounted.

In one embodiment, as illustrated in FIG. 2, the device can have an automated dumping device lift 202. When a waste bin with food scraps and food waste is brought to the automated dumping device lift 202, the lift 202 is capable of mechanically lifting the waste bin to the top port door 204 where the food scraps and food waste can be dumped into the tank.

In another embodiment, as illustrated in FIGS. 4, 7, 9, and 33, the device can have a fill spout 3302, wherein food scraps and food waste are poured through the fill spout 3302 into the tank. The fill spout 3302 may have a cap that prevents heat from escaping when the device is in use and the tank is hot.

In one embodiment, an evacuation port 104 can be located at the rear of the tank to allow removal of the finished, dehydrated material. Removal can take place after the tank has been filled and the food scraps and food waste have been dehydrated to a desired moisture content level. In one embodiment, the desired moisture content level is 10% or less. The dehydrator tank is not intended to operate as a storage unit or a silo, wherein new material is added to previously dehydrated material. Therefore, once the device has dehydrated the food scraps and food waste, the output is removed from the tank through the evacuation port 104 and put into storage such as barrels, bins, or drums (or other storage unit that is capable of being sealed). The dehydrated material will maintain a desired moisture level to be safe for livestock consumption. In one embodiment, the desired moisture level for livestock consumption is 10%.

The dehydrator tank can be a mobile and modular unit. In one embodiment, the dehydrator tank can be mounted on the back of a vehicle or trailer through the use of a steel frame 304. Attachment or removal of the dehydrator tank can be accomplished by rolling it on or off of a vehicle or trailer. Alternatively, the device can be attached to or removed from the vehicle or trailer through the use of a roll-off hook or cable. In one embodiment, a non-dehydrator collection device can be left at an establishment, picked up once it is full, and hauled back to an energy docking or transfer station, and dumped into a dehydrator tank.

In one embodiment, the dehydrator tank, when full, can be picked up from an establishment and transported to an energy docking or transfer station where the food scraps and food waste can be processed. At the energy docking or transfer station, the dehydrator tank can be removed from the vehicle or trailer and placed on the ground. It can then be attached to an energy source such as, but not limited to, natural gas, propane, or electricity. Alternatively, the dehydrator tank can be left on the vehicle or trailer when it is attached to an energy source. The energy source can come from a gas line or from a unit such as, but not limited to, a propane tank or an electric outlet.

In one embodiment, the energy source can heat the temperature control mechanism, such as the coils 102, directly, if the coils 102 are electrically heated, or indirectly, if the coils 102 contain a heating element such as, but not limited to, oil, water, or air. For indirect coil heating, the energy source heats the heating element through the use of a device such as, but not limited to, a furnace or boiler. When either direct or indirect heating is used to produce heat, the coils 102 become heated and, consequently, can heat the air inside of the tank up to temperatures that are high enough to dehydrate the food scraps and food waste, are high enough to kill pathogens when the heat is applied for a long enough period of time, and are low enough to maintain nutritional value. In one embodiment, this temperature range is from 180 to 200 degrees Fahrenheit. In one embodiment, the energy source can also pump and circulate the heating element through the coils 102 to provide an even distribution of heat to the food scraps and food waste. Once the food scraps and food waste have been dehydrated, the evacuation port 104 can allow removal of the finished, dehydrated material. After the dehydrator tank is emptied, the empty tank can be transported back to the establishment it came from, or it can be transported to a new establishment. Once at the old or new establishment, the tank can be removed from the vehicle or trailer and left to be re-filled by the establishment.

In another embodiment, the dehydrator tank can maintain constant mobility by staying attached to a vehicle or trailer while collecting food scraps and food waste from at least one establishment. In this embodiment, a vehicle can tow the dehydrator tank to an establishment where food scraps and food waste can be loaded into the dehydrator tank from a device such as a waste bin. After the dehydrator tank collects food scraps and food waste from one establishment, it can travel to additional establishments to collect food scraps and food waste from those establishments or it can be towed back to the energy docking or transfer station. At the energy docking or transfer station, the dehydrator tank can go through a similar process as that described above, wherein the food scraps and food waste are dehydrated through the use of an energy source and a heating element and then emptied through the evacuation port 104. After the dehydrator tank is emptied, the empty tank can be towed around to the same establishments, to different establishments, or to both to collect more food scraps and food waste.

In one embodiment, the dehydrator tank can be mobile and modular, yet be completely self-contained as a single processing unit with an integrated energy source and temperature control mechanism. The energy source and heating element can be, but is not limited to, propane. The process of dehydrating the food scraps and food waste and removing them through the evacuation port 104 can be the same as that described previously. After removal, the empty tank can be re-filled with more food scraps and food waste.

In one embodiment, the dehydrator tank is mobile but, instead of being transported from an establishment to the energy docking or transfer station, the energy source can be integrated with the vehicle or trailer so that the vehicle or trailer can provide the energy source required for the temperature control mechanism. In this embodiment, the food scraps and food waste can be processed while on the go. The energy source can be the vehicle's engine or it can be mechanical forces provided by the movement of the vehicle or trailer.

The dehydrator tank will ideally dehydrate food scraps and food waste in an eight to twelve hour period to a desired moisture content of 10%, which prevents pathogens from surviving in the output and improves shelf life. Once the material has been processed, it can be used as a livestock feed or feed supplement, compost, or soil amendment.

In one embodiment, the temperature control mechanism is comprised of a cooling element that circulates through coils and serves to cool the food or other materials that are dumped into the tank. The energy source, such as natural gas, electricity, or propane, can provide the energy needed to circulate the cooling element. In one embodiment, the energy source also serves to cool the cooling element. The insulation is capable of maintaining a consistent cold temperature within the tank by preventing warmer air from getting in and colder air from escaping.

Figure 5:
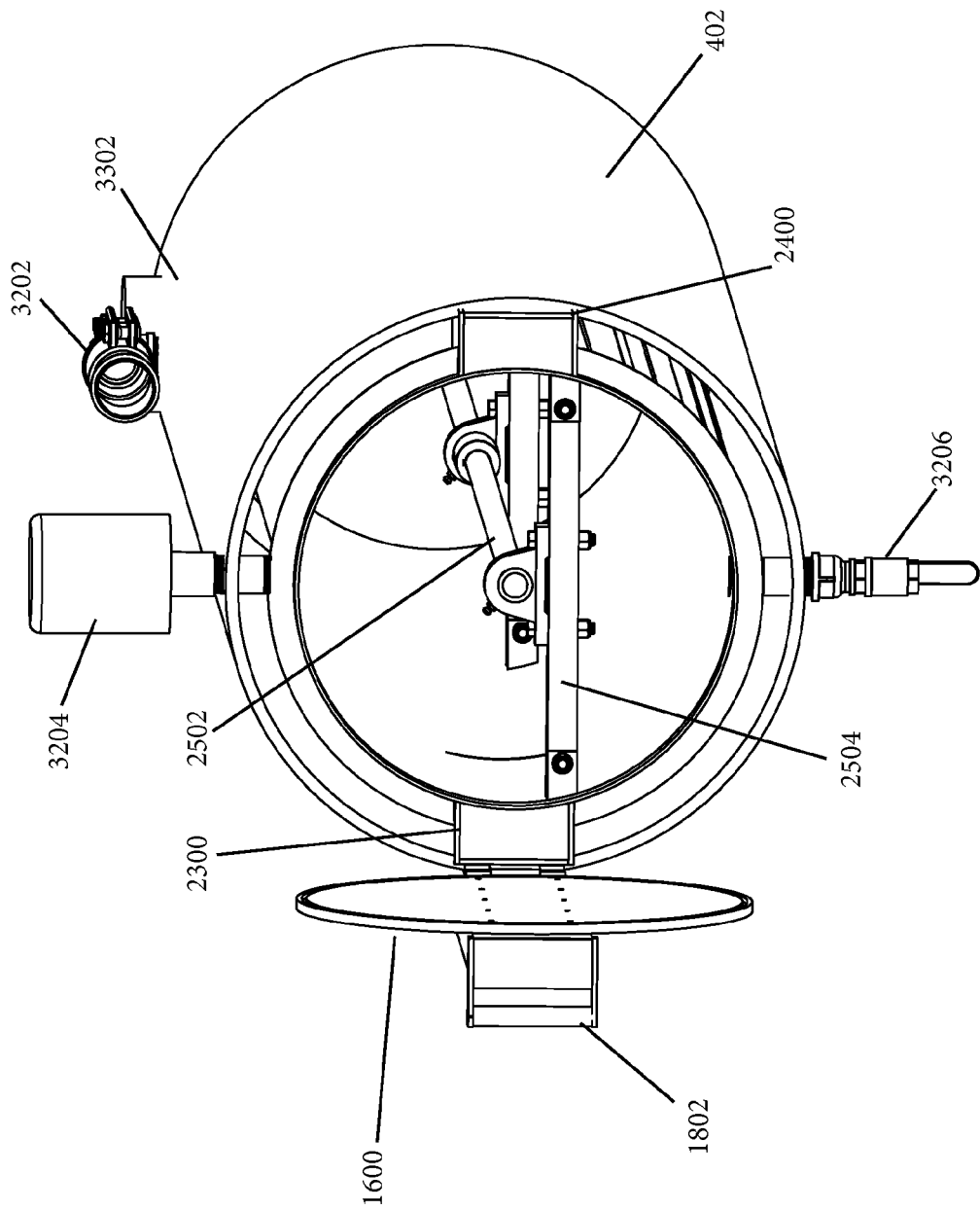
FIG. 5 illustrates a front view of the disclosed dehydrator of FIG. 4 with the front door open.

One embodiment of the disclosed device is illustrated in FIGS. 4 through 33. FIG. 4 illustrates this embodiment of the complete dehydrator device 400 with the external shell 402, rear assembly 404, front door assembly 1600, blower 3202, filter 3204, evacuation tube 3206, fill spout 3302, handle 1802, hinge 1602, and channel cap 2002. FIG. 5 illustrates the complete dehydrator device 400 from the front with the external shell 402, front door assembly 1600, handle 1802, hinge mount 2300, latch mount 2400, shaft 2502, shaft support tab 2504, blower 3202, filter 3204, evacuation tube 3206, and fill spout 3302.

Figure 6A:
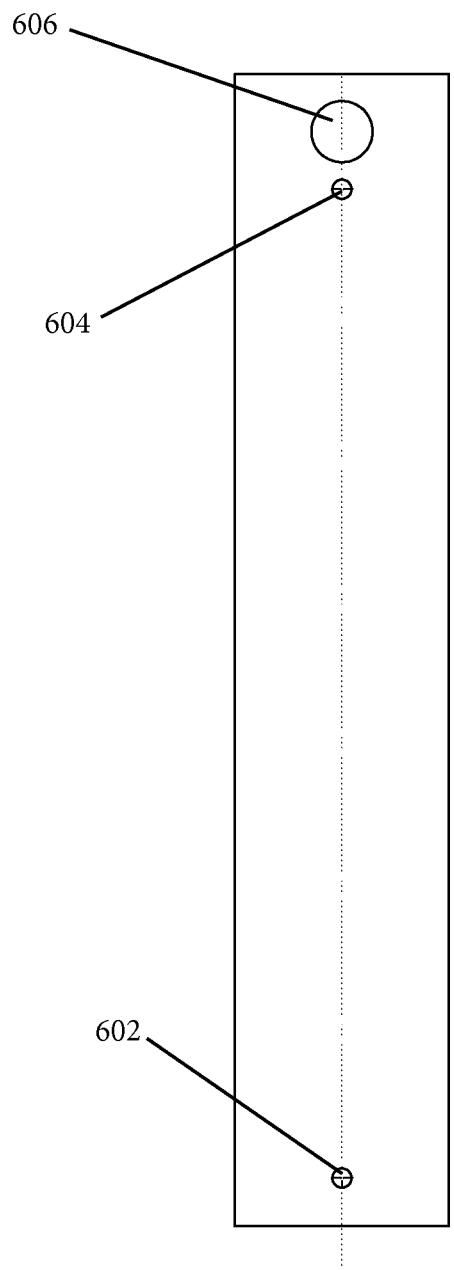
FIG. 6a illustrates a top view of the disclosed dehydrator of FIG. 4.
Figure 6B:
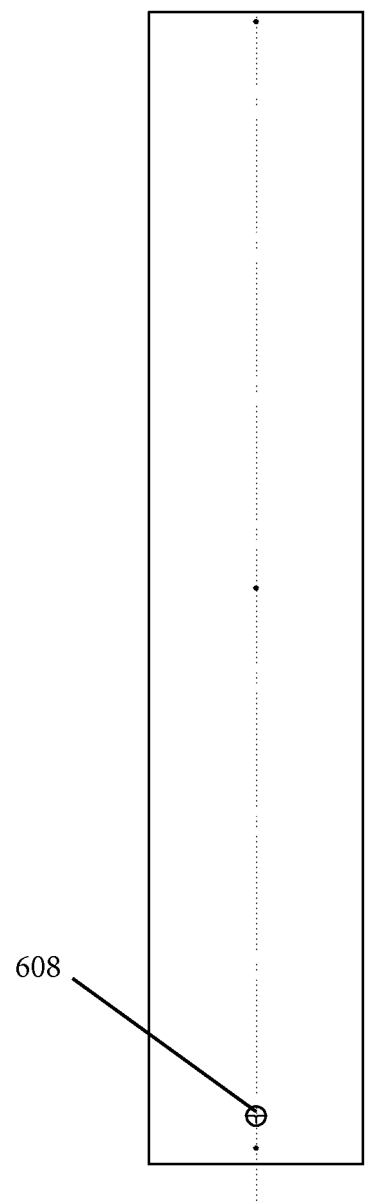
FIG. 6b illustrates a bottom view of the disclosed dehydrator of FIG. 4.

The interior and exterior shells have holes in them for placement of various components, as illustrated in FIGS. 6a and 6b. For example, there is a filter opening 602 for the filter 3204, a blower opening 604 for the blower 3202, a fill spout opening 606 for the fill spout 3302, and an evacuation tube opening 608 for the evacuation tube 3206.

Figure 7:
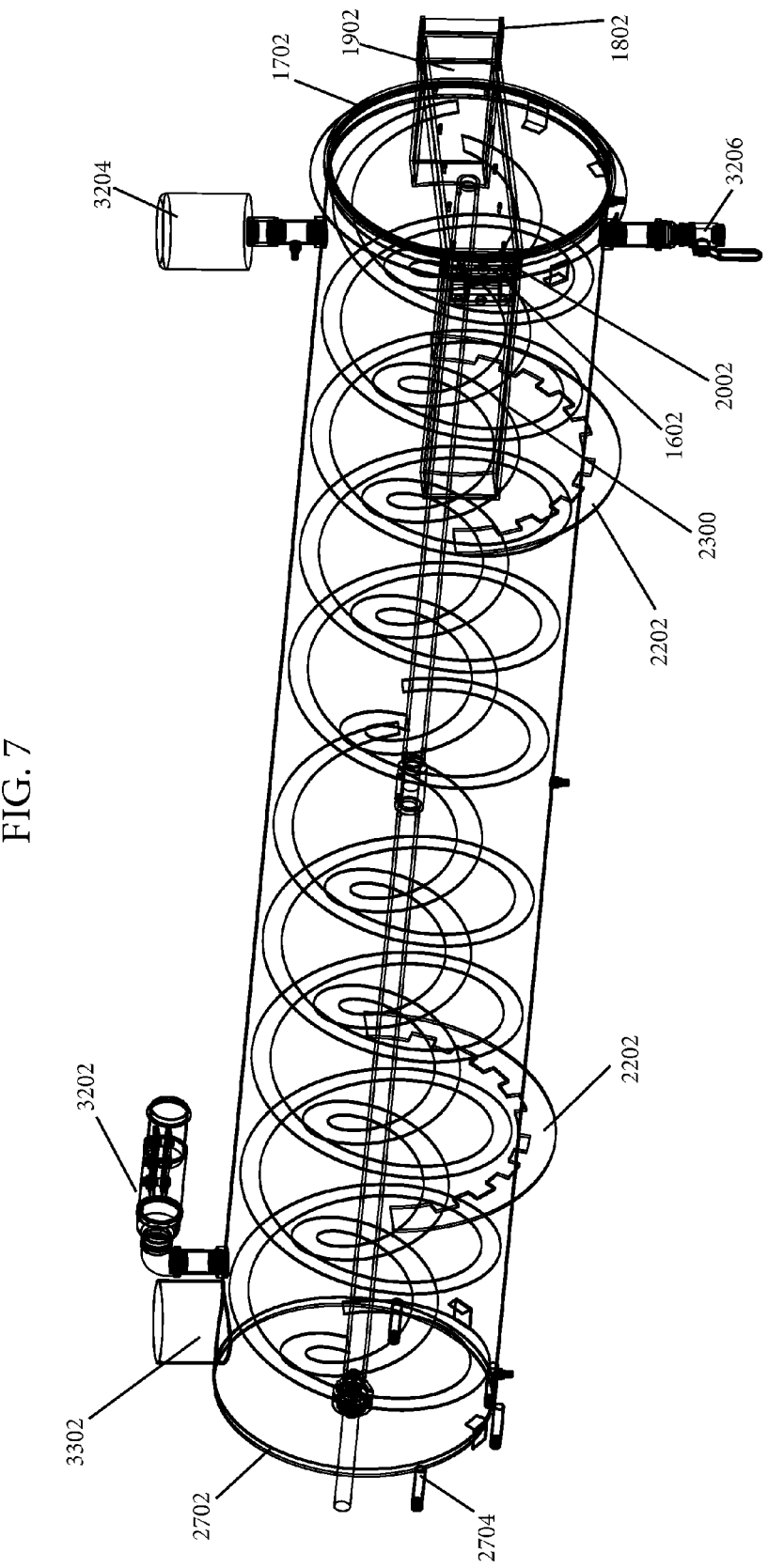
FIG. 7 illustrates a perspective left side view of the interior shell of the disclosed dehydrator of FIG. 4 excluding the outer aluminum sheeting.
Figure 8:
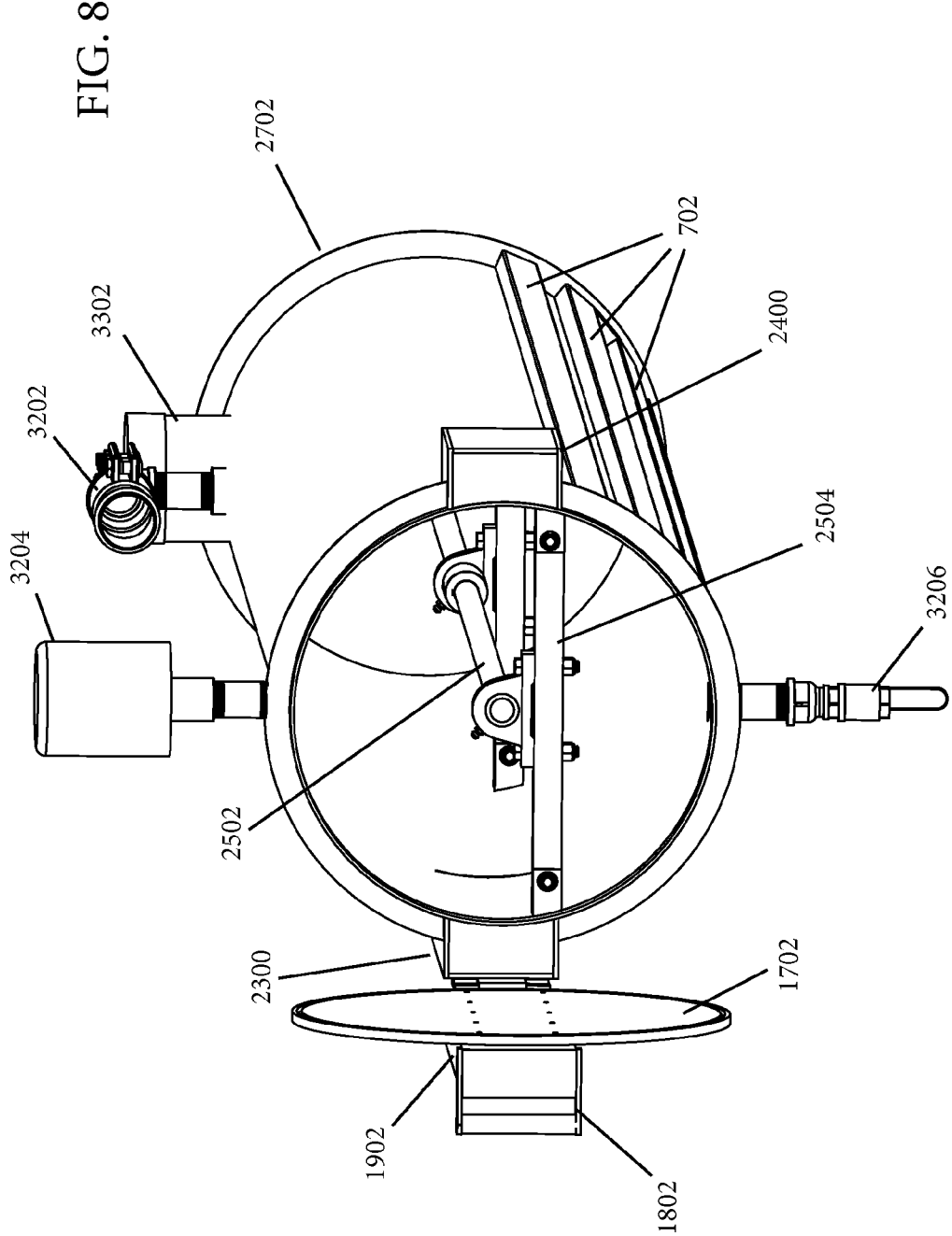
FIG. 8 illustrates a front view of the interior shell of the disclosed dehydrator of FIG. 4 with the front door open and excluding the outer aluminum sheeting.

FIG. 7 illustrates the outside of the interior shell, which has at least one channel 702 and channel connector 704 welded to it. In a preferred embodiment, the outside of the interior shell has eight channels 702 and six channel connectors 704. It also is where several components are welded to the device, such as the blower 3202, filter 3204, evacuation tube 3206, fill spout 3302, tank supports 2202, hinge mount 2300, hinge 1602, rear angle ring 2702, and single edge pipe nipples 2704. The door mount and cap 2002, front door 1702, door mount bracket 1902, and handle 1802 are also attached to the outside of the interior shell. FIG. 8 illustrates the interior shell from the front with all of the above components visible. It also illustrates the shaft 2502, shaft support tabs 2504, and the latch mount 2400.

Figure 9:
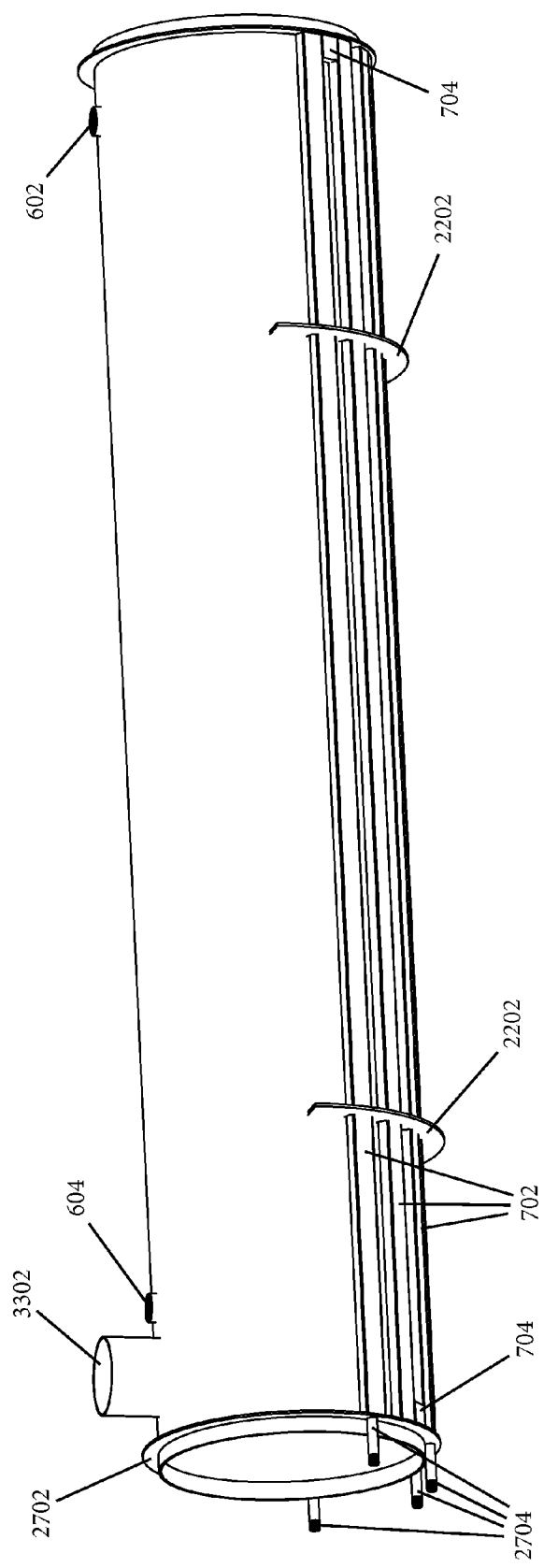
FIG. 9 illustrates a left side view of the interior shell of the disclosed dehydrator of FIG. 4.
Figure 10:
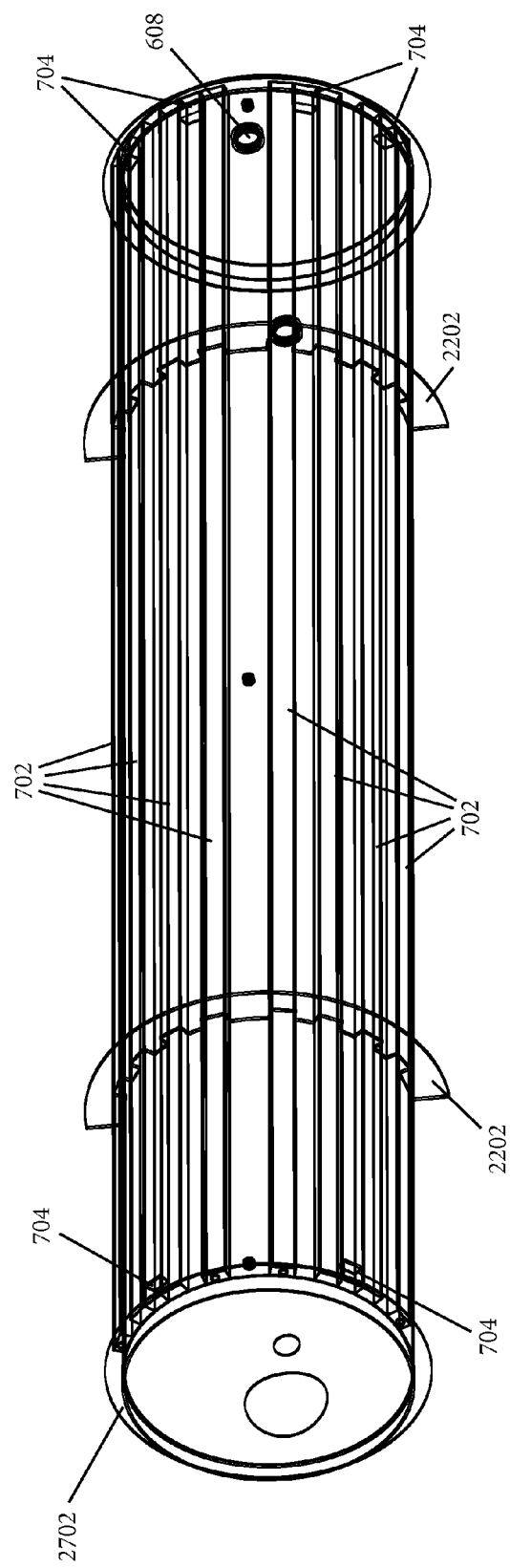
FIG. 10 illustrates a bottom view of the interior shell of the disclosed dehydrator of FIG. 4.

FIG. 9 illustrates the outside of the interior shell from a perspective back view. Some of the components are removed in this view so the filter opening 602 and blower opening 604 are visible. Four single edge pipe nipples 2704 can be welded into the rear angle ring 2702 to use as intake and outlet ports for the heating element. FIG. 10 illustrates the outside of the interior shell from a bottom view with several of the above components and the evacuation tube opening 608 visible.

Figure 11:
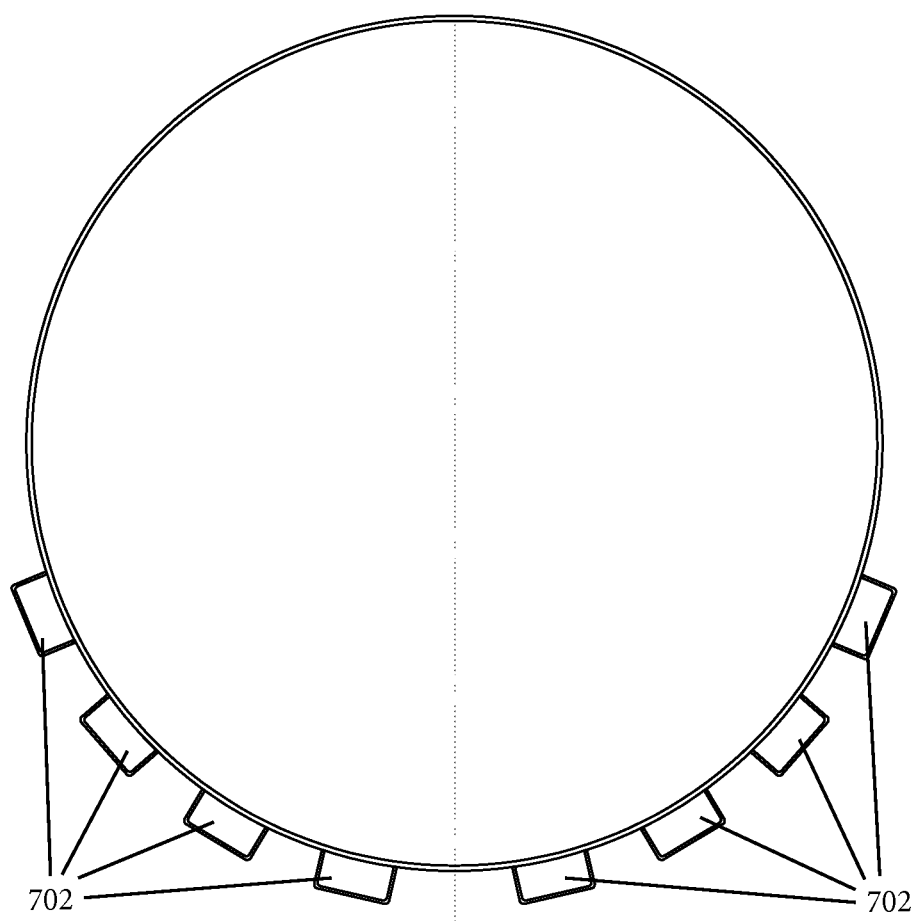
FIG. 11 illustrates a back view of the interior shell of the disclosed dehydrator of FIG. 4, wherein the channel spacing is displayed.
Figure 12:
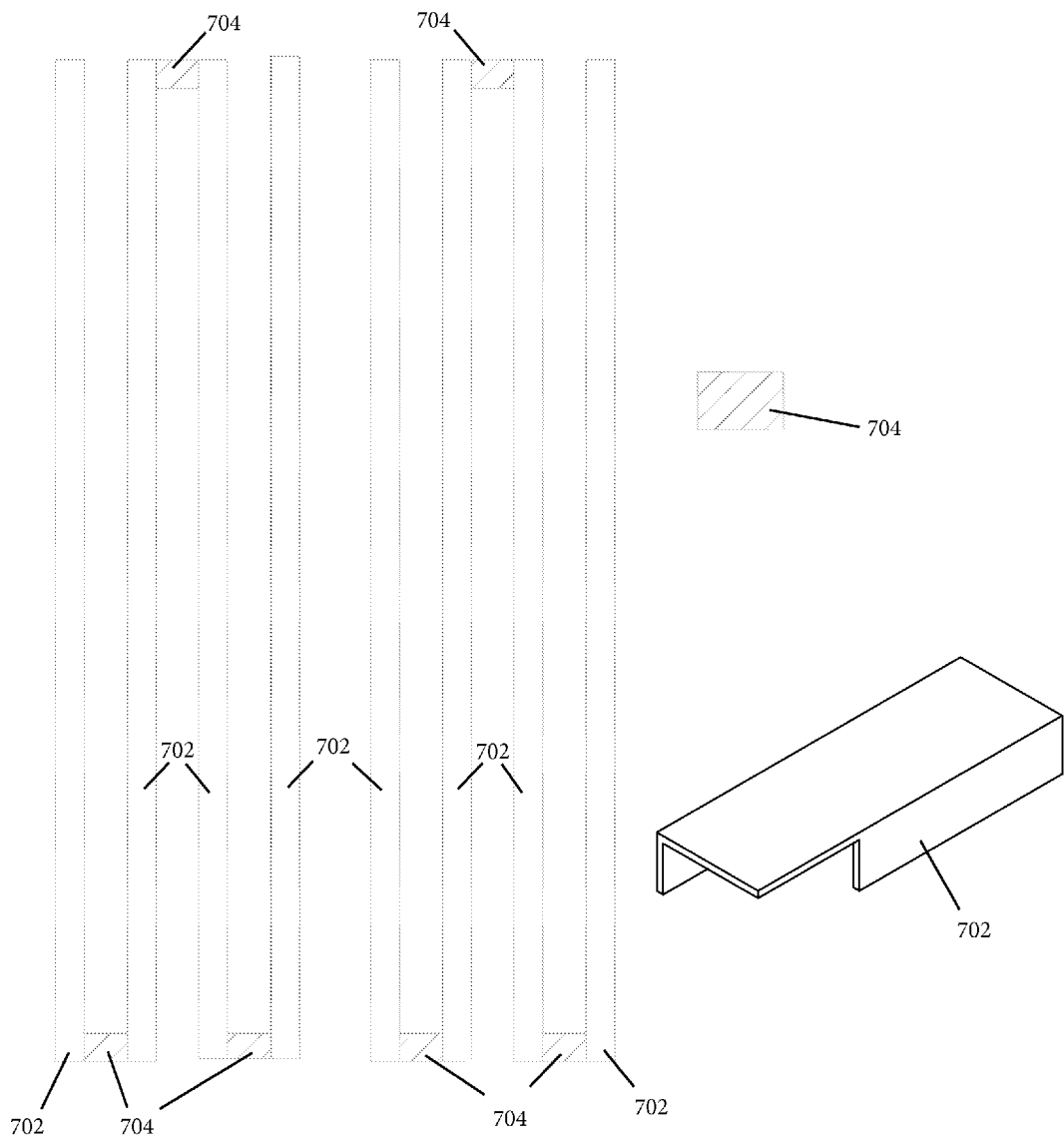
FIG. 12 illustrates a linear layout of the channels and channel connectors of the disclosed dehydrator of FIG. 4.
Figure 14:
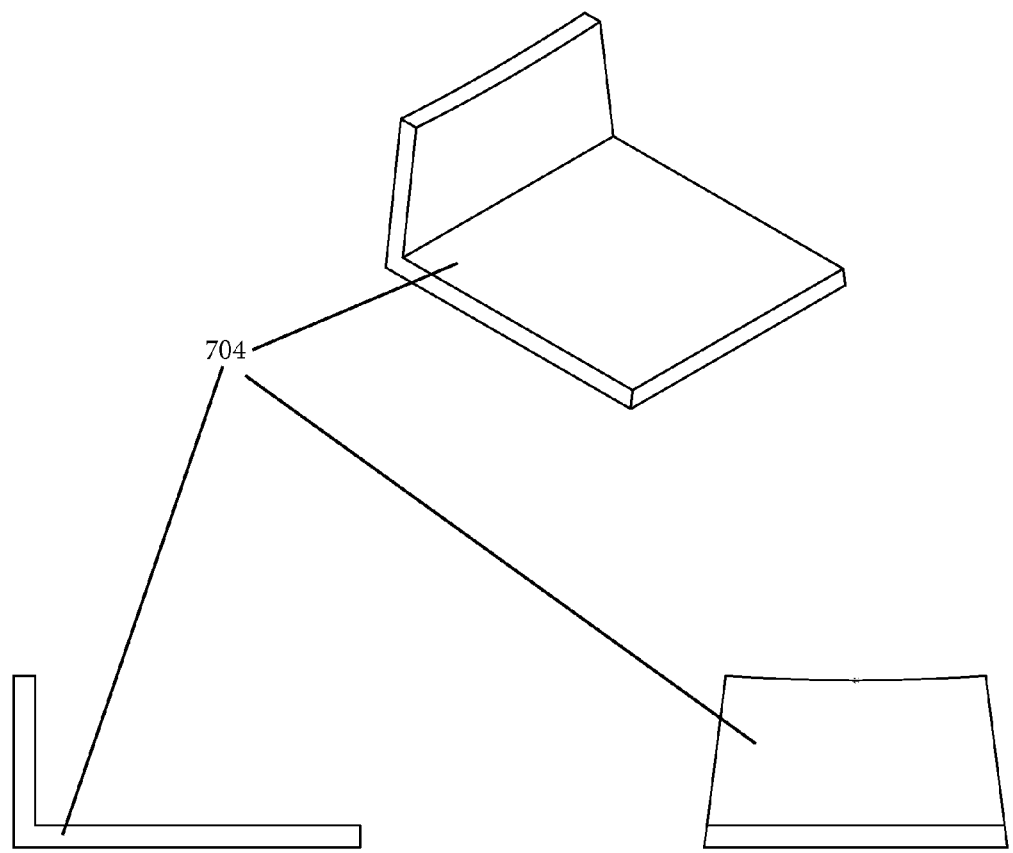
FIG. 14 illustrates a channel connector of the disclosed dehydrator of FIG. 4.

FIGS. 11 through 14 illustrate the channels 702 and channel connectors 704 that attach to the outside of the interior shell. FIG. 11 shows the device from the back with the eight channels 702 running along the length of the device. FIG. 12 illustrates the assembly flow of the channels 702 and channel connectors 704. As illustrated, each channel 702 is connected to the channel or channels 702 next to it via a channel connector 704. As described previously, a preferred embodiment of the invention includes eight channels 702 and six channel connectors 704. FIG. 13 is a detailed illustration of one channel 702, wherein the channel 702 has a base and two walls that run the length of the device. The size of the channel 702 can vary, but in one embodiment, the base is 2 inches across and each wall is one inch tall. FIG.

14 is a detailed illustration of one channel connector 704, wherein the channel connector 704 has a base and a sidewall. The size of the channel connector 704 can vary, but in one embodiment, the base is 2 inches long by 1.75 inches wide and the sidewall is 1 inch tall, 1.75 inches wide at its base, and 1.5 inches wide at its top.

Figure 15:
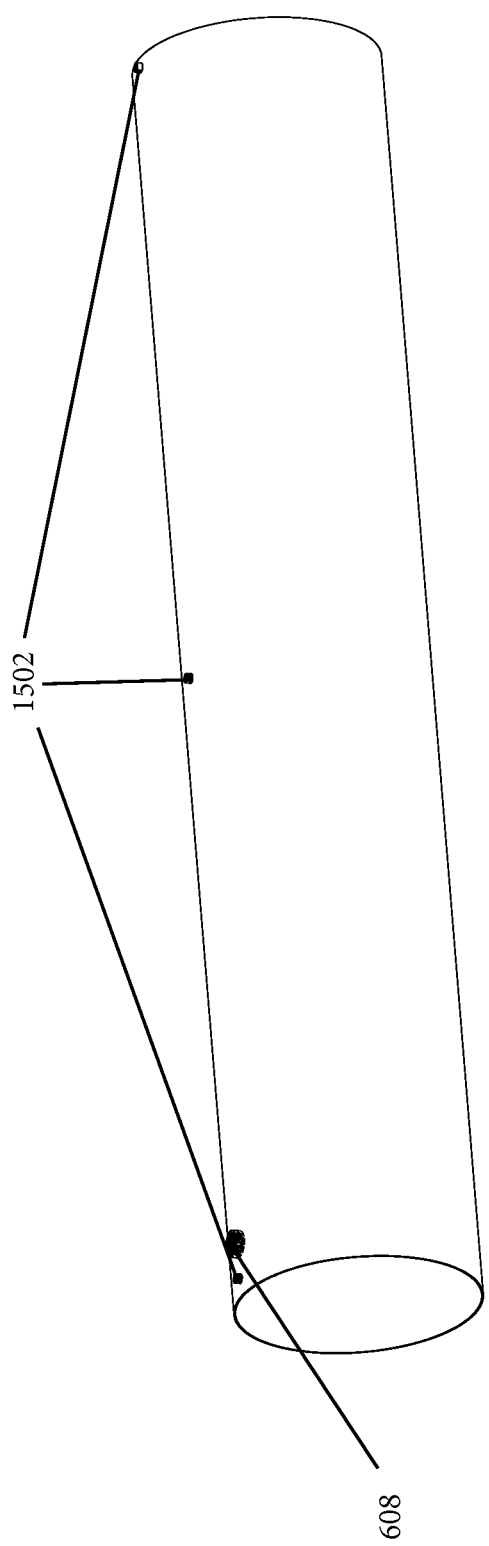
FIG. 15 illustrates a perspective left side view of the interior shell of the disclosed dehydrator of FIG. 4.

FIG. 15 illustrates the bottom of the interior shell, wherein bottom pipe nipple openings 1502 and the evacuation tube opening 608 are located on the bottom of the interior shell.

Figure 16:
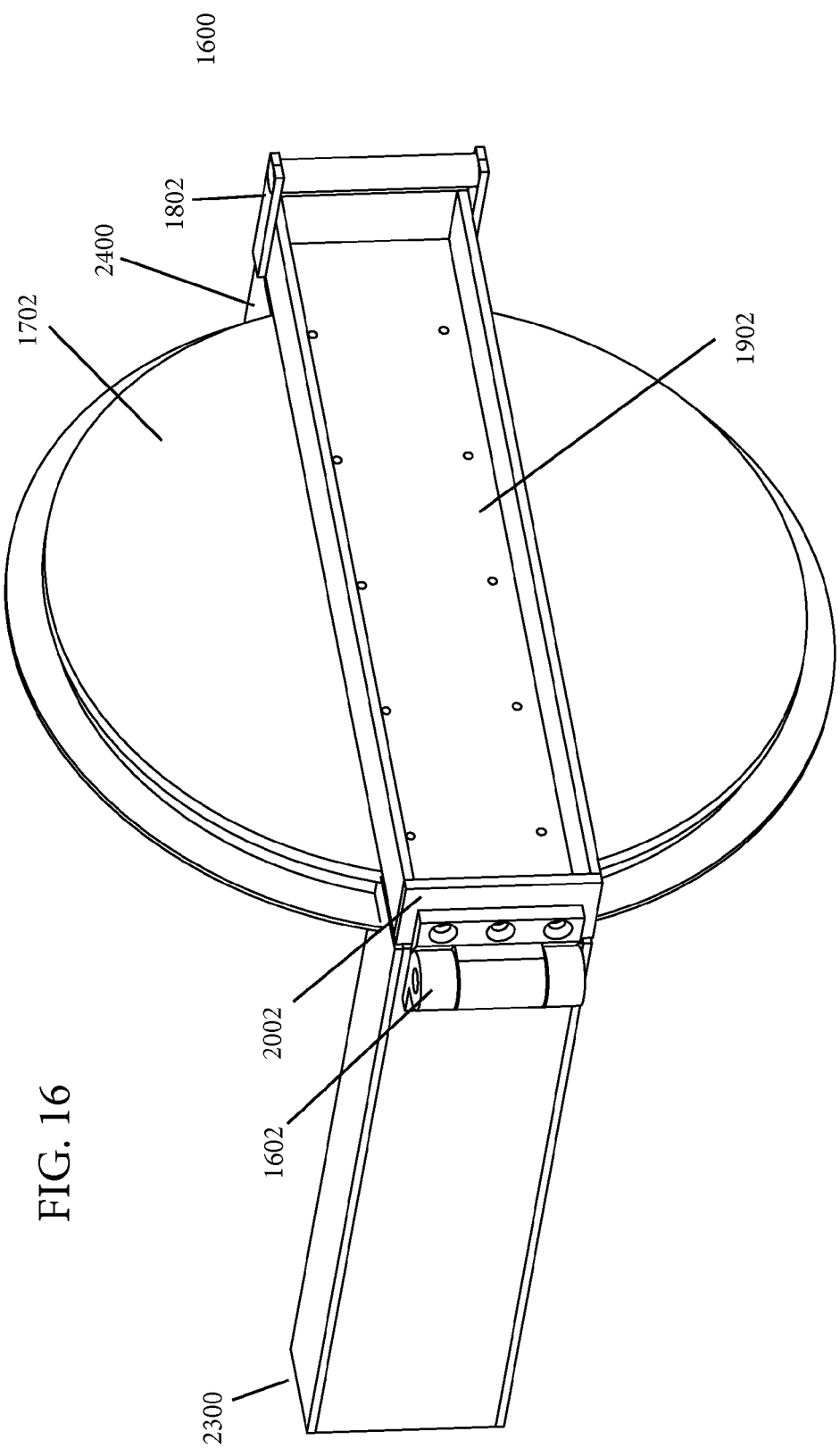
FIG. 16 illustrates the door assembly of the disclosed dehydrator of FIG. 4.
Figure 17:
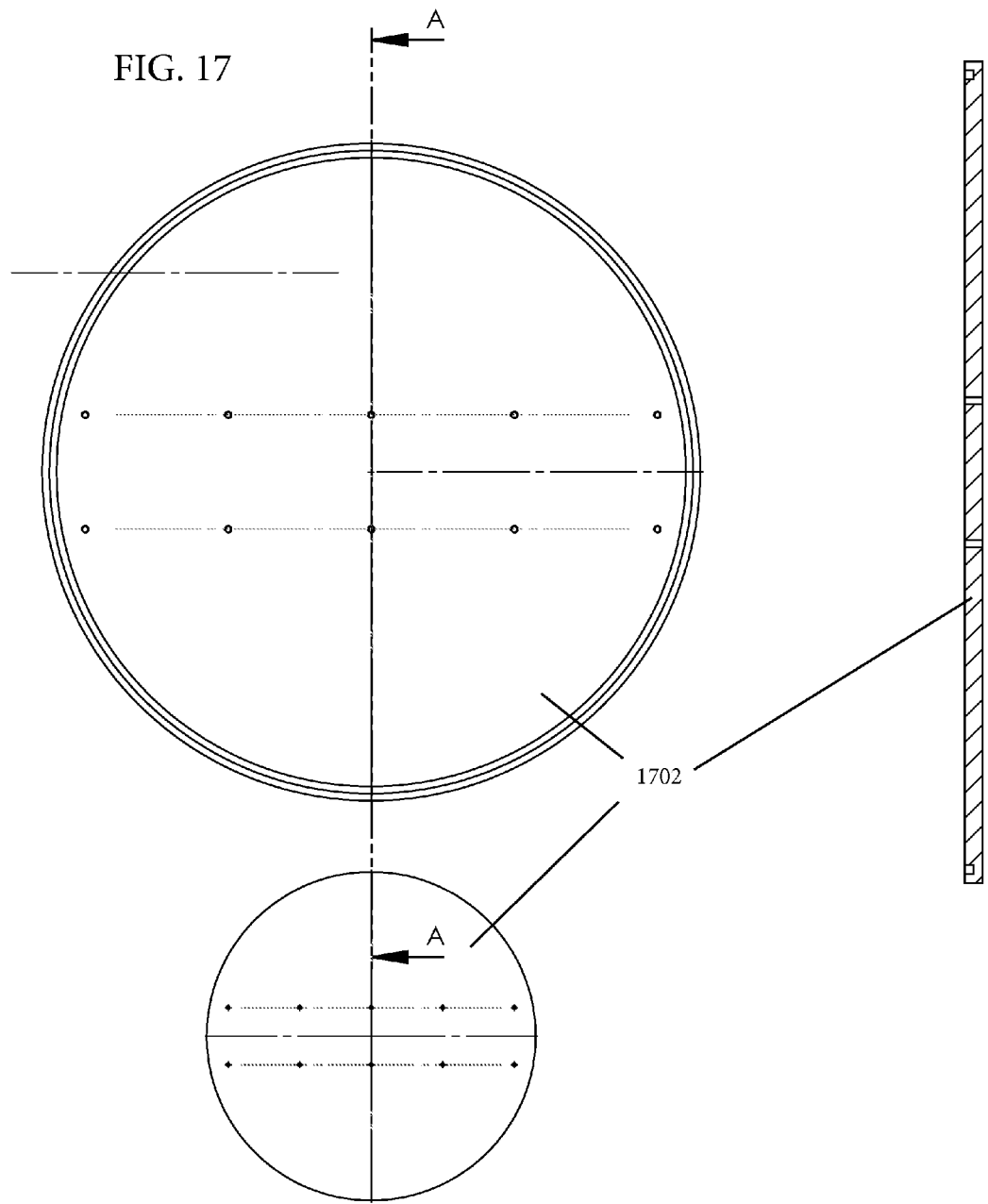
FIG. 17 illustrates the door of the door assembly of the disclosed dehydrator of FIG. 4.

FIGS. 16 through 24 illustrate the front door assembly 1600. FIG. 16 shows several of the components that make up the front door assembly 1600 including, but not limited to, the front door 1702, handle 1802, door mount 1902, door mount and cap 2002, hinge 1602, hinge mount 2300, and latch mount 2400. FIG. 17 shows one embodiment of the door 1702 in which the holes where the door mount 1902 can attach are illustrated. The door 1702 can be 23 inches wide and the holes for the door mount 1902 can run in two horizontal lines and be five inches from each other. In one embodiment, there are five holes on each line, for a total of 10 holes, and the two lines can each be two inches from the midline of the door 1702 and be four inches from each other. Therefore, one line of holes will run two inches above the midline and one line of holes will run two inches below the midline.

Figure 18:
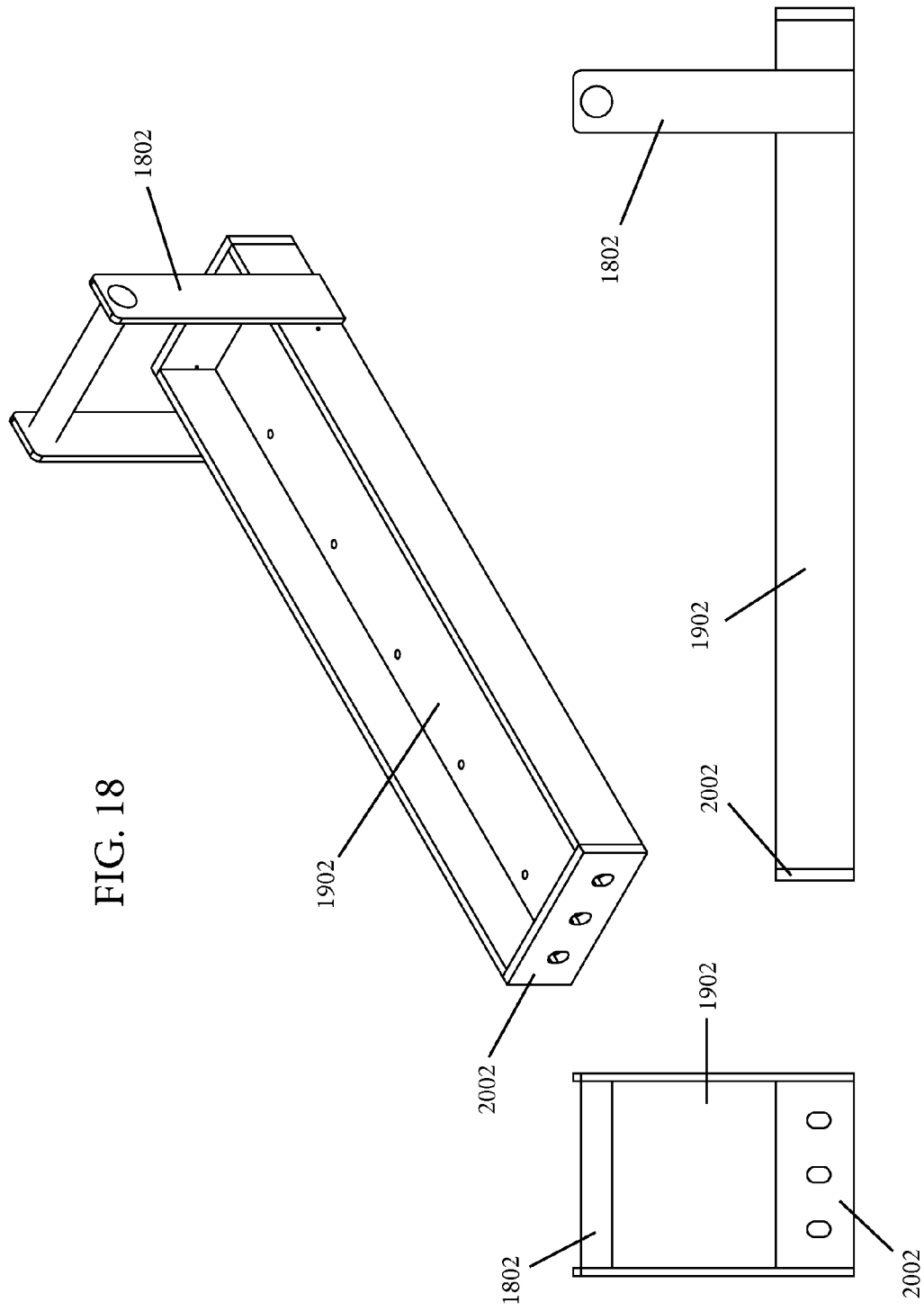
FIG. 18 illustrates the hinge mount assembly of the door assembly of the disclosed dehydrator of FIG. 4.
Figure 19:
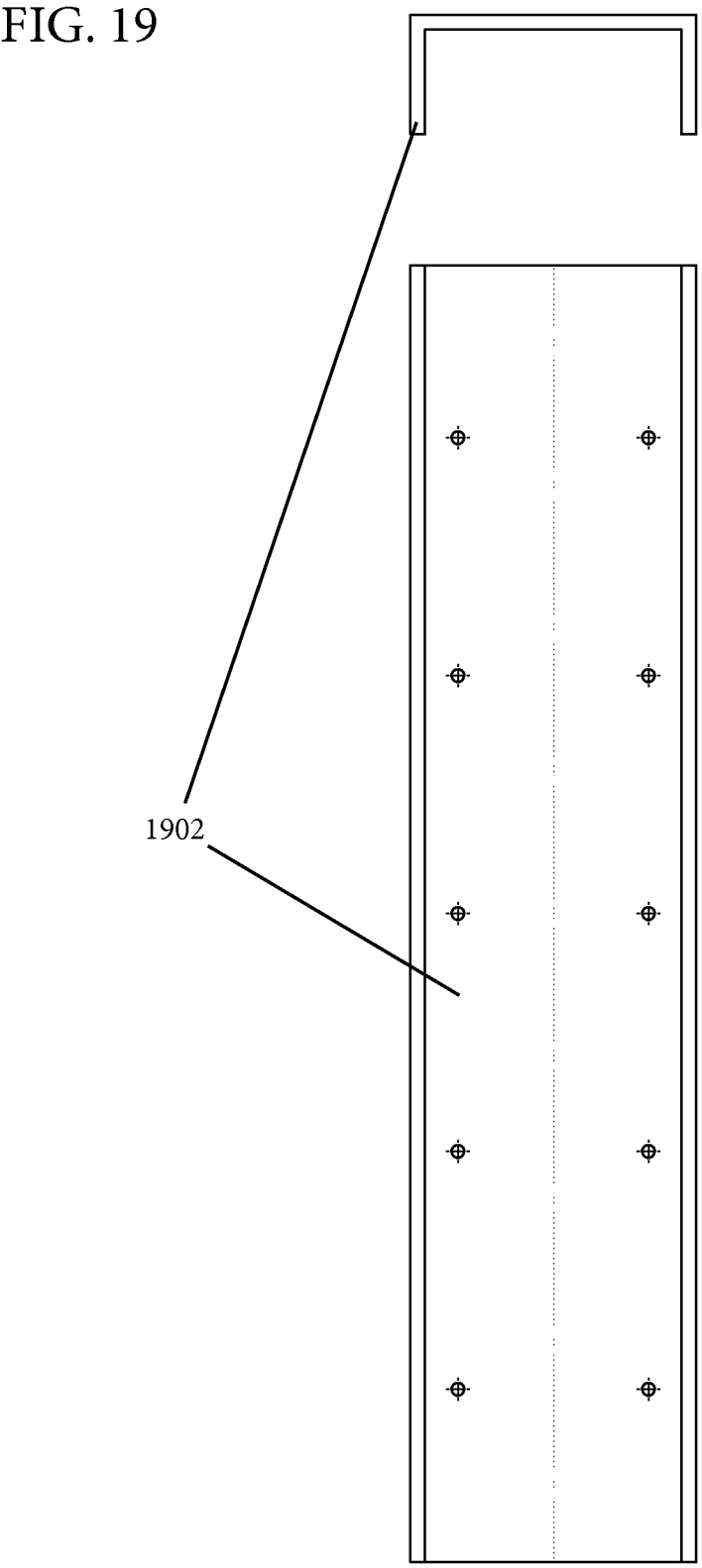
FIG. 19 illustrates the door mount bracket of the hinge mount assembly of the door assembly of the disclosed dehydrator of FIG. 4
Figure 20:
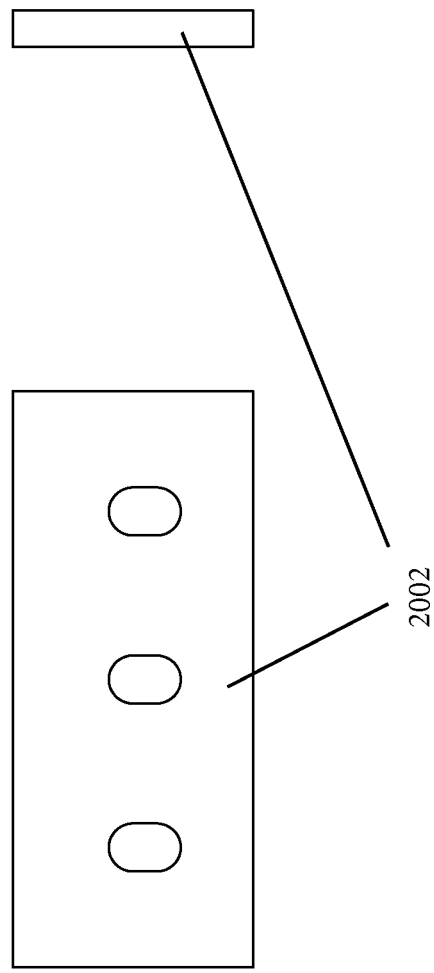
FIG. 20 illustrates the channel cap of the hinge mount assembly of the door assembly of the disclosed dehydrator of FIG. 4.
Figure 21:
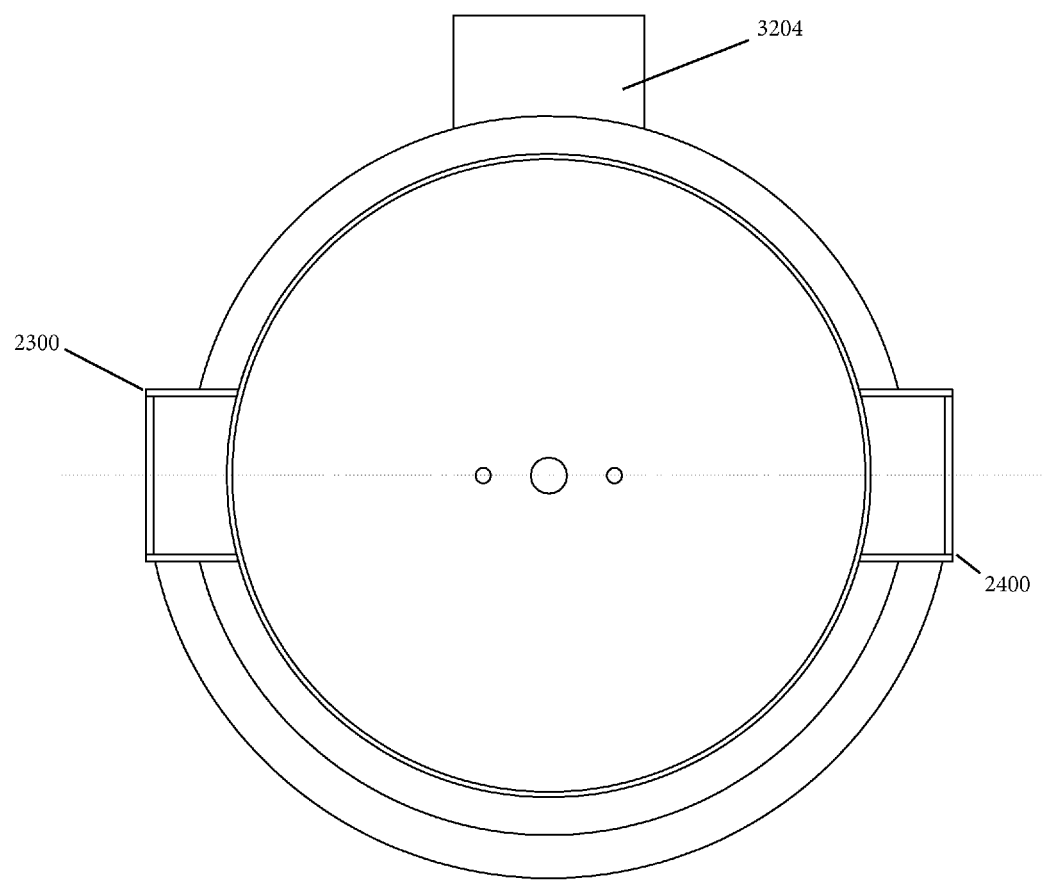
FIG. 21 illustrates a front view of the hinge mount and latch mount of the door assembly of the disclosed dehydrator of FIG. 4.

The hinge mount assembly is illustrated in FIG. 18 and includes the handle 1802, door mount bracket 1902, and door mount and cap 2002. The handle 1802 can have two vertical, substantially rectangular pieces that are connected via a cylindrical tube on one end and attached to one end of the door mount bracket 1902 on their other ends. The door mount bracket 1902 can have two horizontal lines of holes that match up to those holes described above in the door 1702, as illustrated in FIG. 19. For example, there can be five holes per line (each hole five inches from the next) with two lines (for a total of ten holes) running horizontal to each other and four inches apart. The door mount and cap 2002 can be welded to one end of the door mount bracket 1902, opposite the end to which the handle 1802 is welded, and can have holes in it to allow the hinge 1602 to connect it to the hinge mount 2300, as illustrated in FIG. 20. In a preferred embodiment, the door mount and cap 2002 has three holes.

FIGS. 21 through 24 illustrate the relation of the hinge mount 2300 and latch mount 2400 to the door assembly 1600. FIG. 22 shows the hinge mount parts and the latch mount parts and FIGS. 23 and 24 show an exploded view of the assembly of the hinge mount 2300 and latch mount 2400. Both mounts are substantially rectangular with a base, two long sidewalls, and two short end walls, wherein the end walls are curved to enable the mounts to fit snuggly against the tank.

Figure 25:
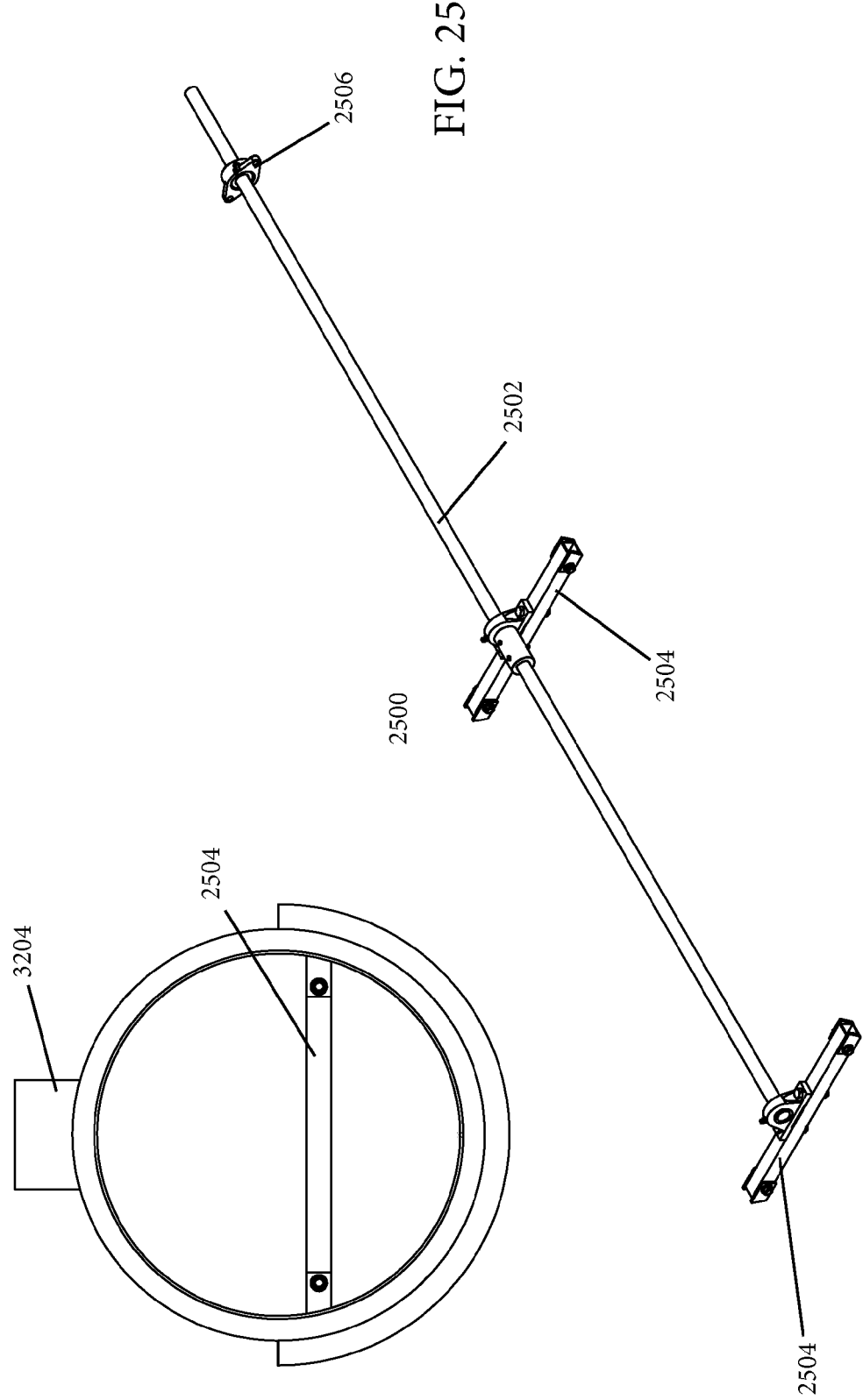
FIG. 25 illustrates the shaft support brace of the disclosed dehydrator of FIG. 4 and the general location of the shaft support brace within the disclosed dehydrator of FIG. 4.

A shaft support 2500 is located on the inside of the interior shell in one embodiment, as illustrated in FIG. 25. The shaft support 2500 includes pieces such as, but not limited to, a shaft 2502, at least one shaft support tab 2504, and a rear end cap 2506. In a preferred embodiment, one shaft support tab 2504 is welded to the shaft 2502 on one end, one shaft support tab 2504 is welded to the shaft 2502 in the middle, and the rear end cap 2506 is welded to the shaft 2502 near the end of the shaft 2502. FIG. 26a illustrates a shaft support tab 2504 from the front, where two holes for attachment purposes are located on the ends of the front of the shaft support tab 2504. FIG. 26b illustrates a shaft support tab 2504 from the top, where two holes that aid in attaching the shaft 2502 to the shaft support tab 2504 are located. The spacing of the holes can vary, but in one embodiment, the holes in the front are 18 inches from each other and 1.5 inches from the ends, and the holes on the top are 4.5 inches from each other and 8.25 inches from the ends. FIG. 26c shows a side view of one of the shaft support tabs 2504, wherein the shaft support tab 2504 is hollow, has an interior length of 1.25 inches and an exterior length of 1.5 inches.

Figure 27:
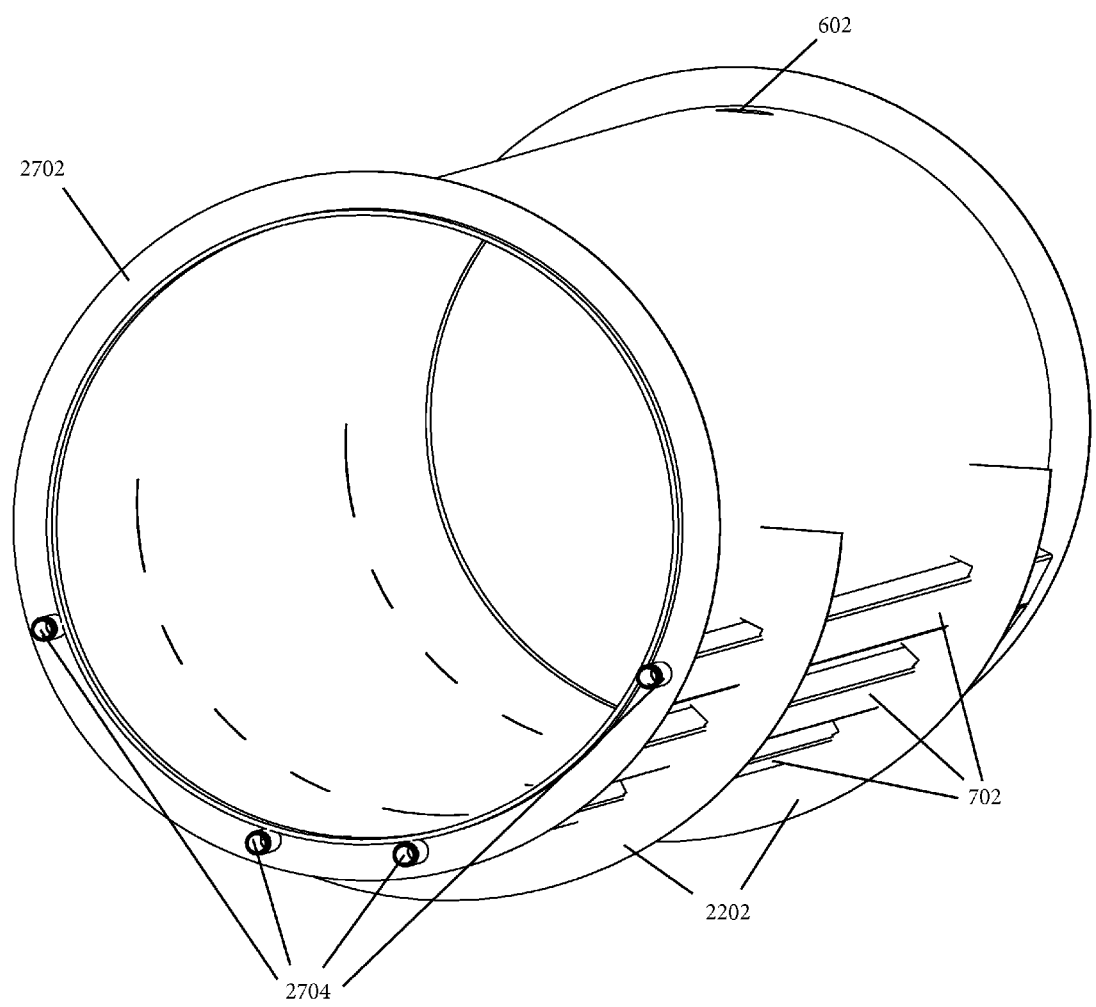
FIG. 27 illustrates a rear perspective view of the interior shell of the disclosed dehydrator of FIG. 4.
Figure 28:
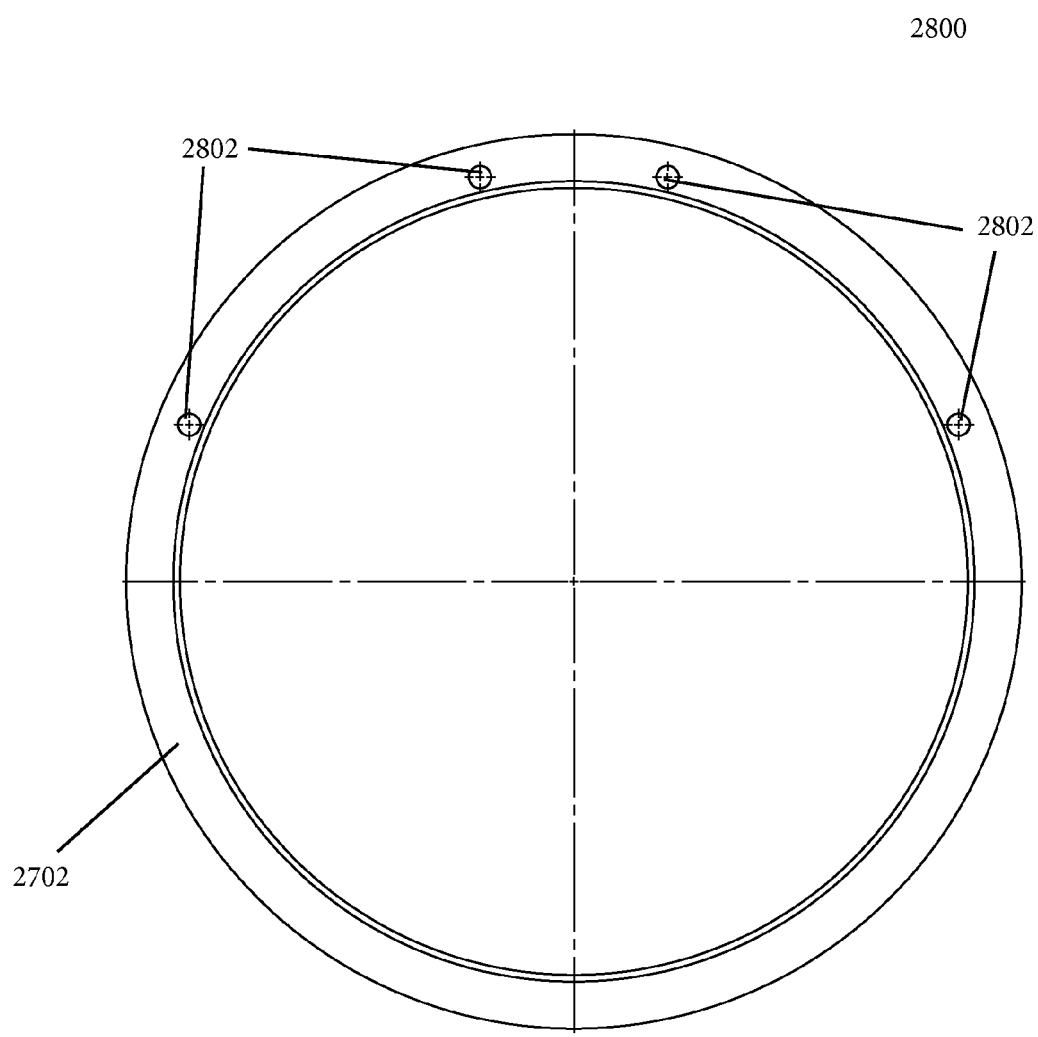
FIG. 28 illustrates a rear view of the interior shell of the disclosed dehydrator of FIG. 4.

The rear assembly 404 of the dehydrator device 400 can include a rear angle ring 2702 and single edge pipe nipples 2704, as illustrated in FIG. 27. The single edge pipe nipples 2704 can be used as intake or outlet ports, or a combination of intake and outlet ports. For example, in one embodiment, the single edge pipe nipples 2704 are located on the bottom half of the rear angle ring 2702, as illustrated in FIGS. 27 and 28, the outer single edge pipe nipples 2704 are outlet ports and the inner single edge pipe nipples 2704 are intake ports. In another embodiment, the outer single edge pipe nipples 2704 are intake ports and the inner single edge pipe nipples 2704 are outlet ports. In another embodiment, all of the single edge pipe nipples 2704 can act as both intake and outlet ports. The rear assembly 404 can also include a rear disk 2900. The rear disk 2900 can include shaft support holes 2902 that enable the shaft support 2500 to attach to the inside of the rear disk 2900. In one embodiment, the rear disk 2900 is 22 inches wide and ⅛ of an inch thick.

Figure 30:
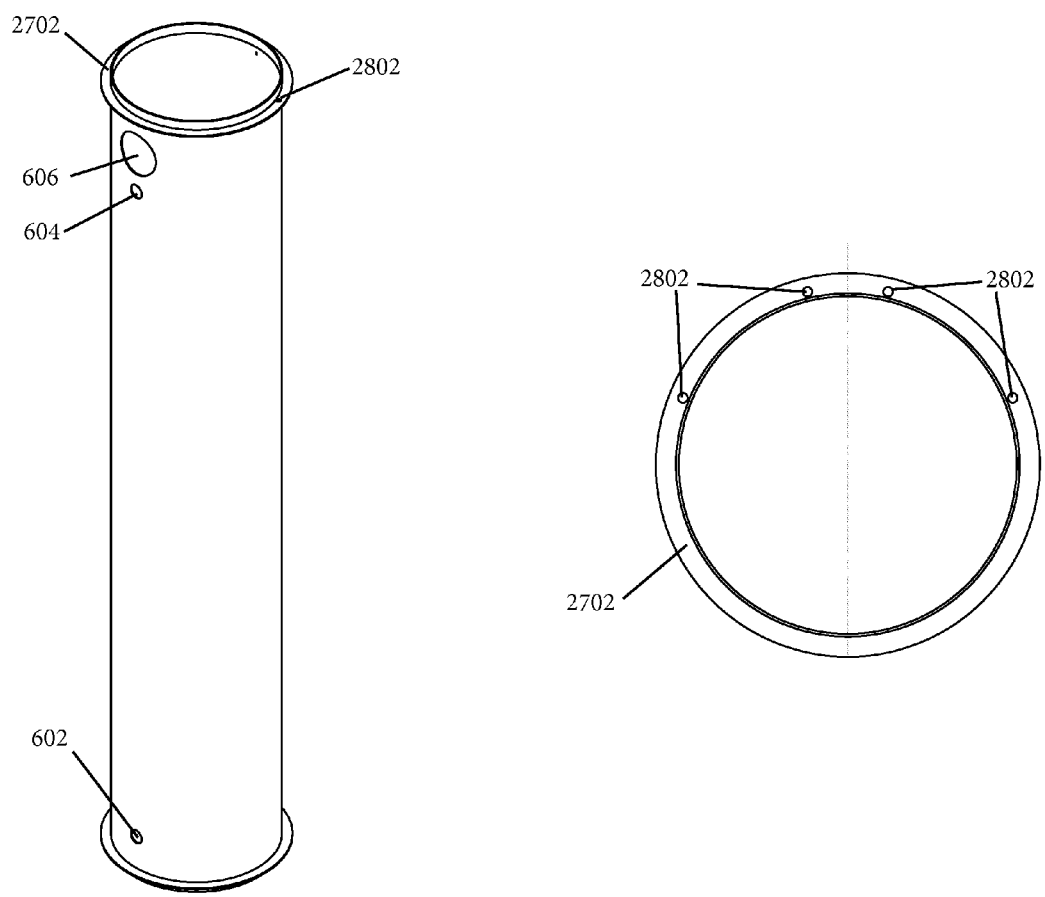
FIG. 30 illustrates rings attached to the front and rear of the disclosed dehydrator of FIG. 4.
Figure 32:
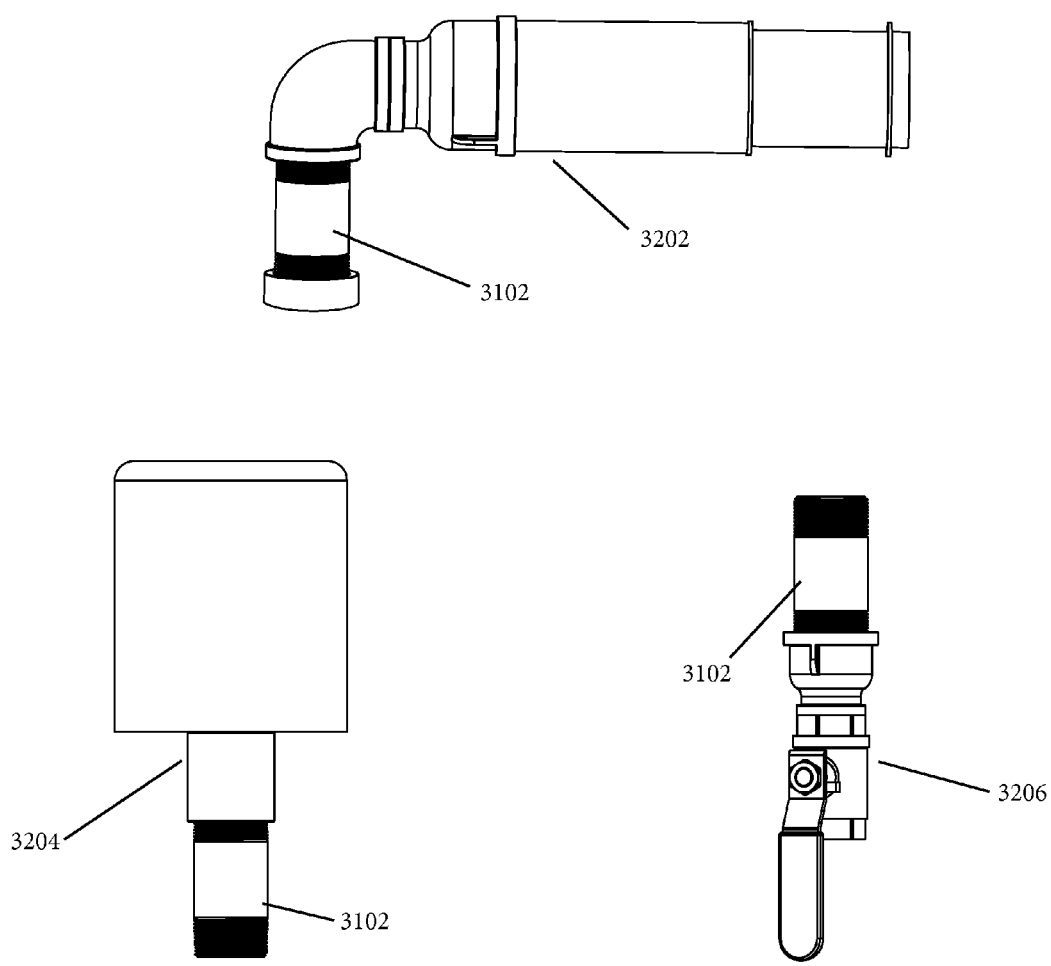
FIG. 32 illustrates various connection pieces of the disclosed dehydrator of FIG. 4.
Figure 33:
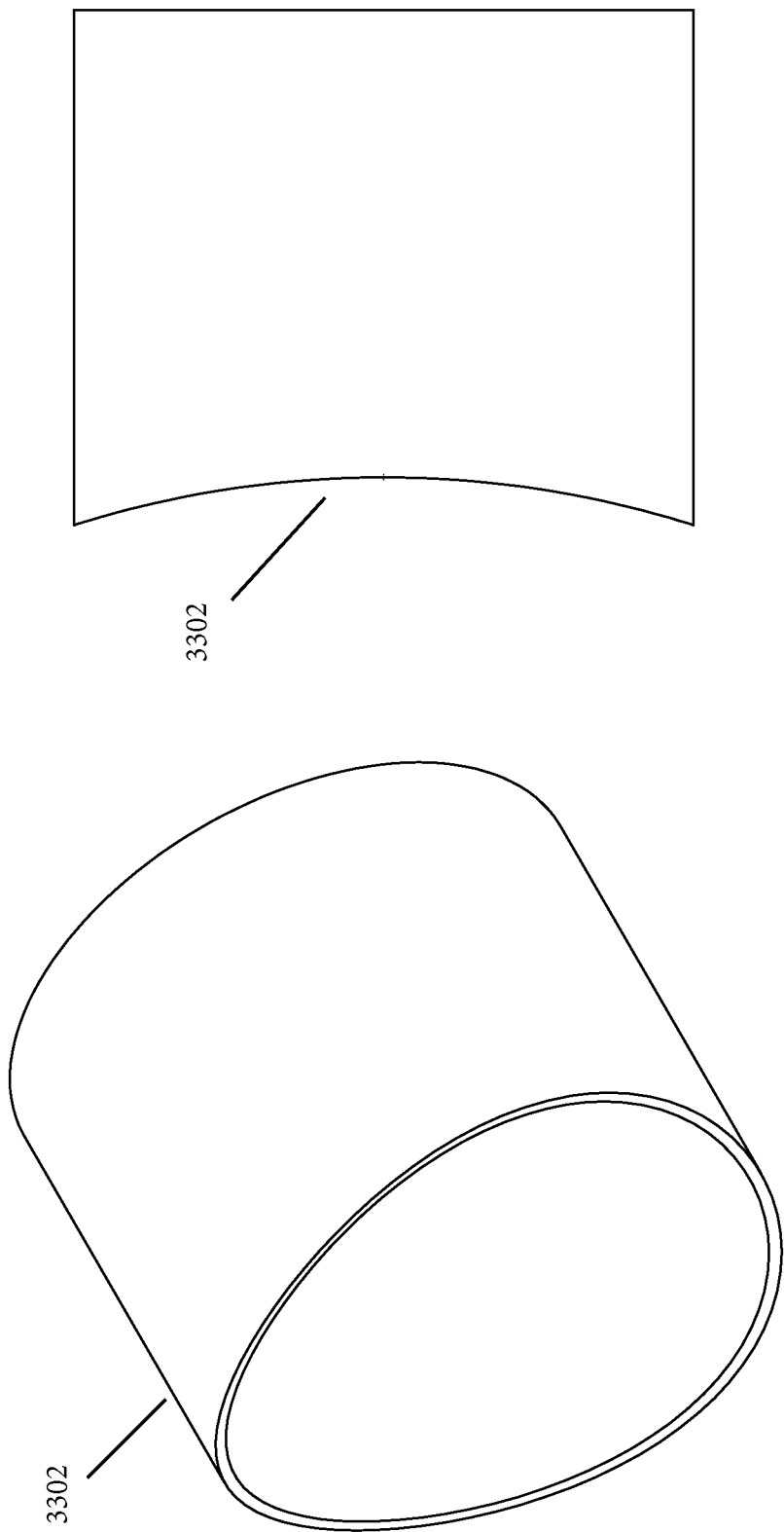
FIG. 33 illustrates a connection piece of the disclosed dehydrator of FIG. 4.

FIG. 30 illustrates several components of the interior shell including the rear angle ring 2702, holes for pipe nipples 2802, filter opening 602, blower opening 604, and fill spout opening 606. As illustrated in FIG. 31, the various components can be attached to the shells via a double-edged pipe nipple 3102 or a single edge pipe nipple 2704. One end of the double-edged pipe nipple 3102 can screw into the component, such as the blower 3202, filter 3204, and evacuation tube 3206, and the other end of the double-edged pipe nipple 3102 can screw into the interior shell at the corresponding opening. FIG. 32 illustrates the blower 3202, filter 3204, and evacuation tube 3206, of the disclosed device. FIG. 33 illustrates the fill spout 3302 of the disclosed device.

The various embodiments described above are provided by way of illustration only and should not be construed to limit the claimed invention. Those skilled in the art will readily recognize various modifications and changes that may be made without following the example embodiments and applications illustrated and described herein and without departing from the true spirit and scope of the claimed invention.

What is claimed is:
1. A mobile and modular food waste processing device for dehydrating food waste and creating feed for livestock, the device comprising:
   a frame;
   an exterior shell;
   a cylindrical interior shell forming an inner cavity;
   insulation material located between the cylindrical interior shell and the exterior shell;
   a temperature control mechanism located between the cylindrical interior shell and the insulation material;
   a fill port on an upper portion of the cylindrical exterior shell that connects to the inner cavity of the cylindrical interior shell and is configured to receive food waste;
   an evacuation drain on a lower portion of the cylindrical exterior shell that connects to the inner cavity of the cylindrical interior shell and is configured to collect and expel moisture and water from the food waste;
   a vent on the upper portion of the cylindrical exterior shell that connects to the inner cavity of the cylindrical interior shell and is configured to vent moisture from the food waste; and an evacuation port that connects to the inner cavity of the cylindrical interior shell;
wherein the device is configured to removably mount on a platform through the use of the metal frame.

2. The device of claim 1, wherein the cylindrical interior shell is made of stainless steel.

3. The device of claim 2, wherein the device is permanently fixed to a platform.

4. The device of claim 1, wherein the temperature control mechanism comprises heating coils.

5. The device of claim 4, wherein the heating coils contain a heating element and are configured to allow the heating element to circulate through the heating coils.

6. The device of claim 5, wherein the heating element is oil.

7. The device of claim 6, further comprised of an energy source configured to activate the temperature control mechanism.

8. The device of claim 7, wherein the energy source is configured to activate the temperature control mechanism through the use of a heat transfer unit selected from the group consisting of a boiler, a furnace, electricity, and natural gas.

9. The device of claim 5, wherein the heating element is water.

10. The device of claim 1, wherein the temperature control mechanism comprises cooling coils.

11. The device of claim 1, wherein the temperature control mechanism comprises direct-fired tube heaters.

12. The device of claim 1, further comprising a fan that circulates air.

13. The device of claim 1, further comprising at least one auger in the inner cavity of the cylindrical interior shell configured to mix the food waste to ensure even heating.

14. The device of claim 1, further comprising a dumping device lift.

15. The device of claim 1, wherein the exterior shell is cylindrical.

16. The device of claim 1, wherein the frame is metal.

17. The device of claim 1, wherein the device is removable from the platform using a roll-off feature.

18. A mobile and modular food waste processing device for dehydrating food waste and creating feed for livestock, the device comprising:
a metal frame;
a cylindrical exterior shell;
a cylindrical, stainless steel interior shell forming an inner cavity;
insulation material located between the cylindrical, stainless steel interior shell and the cylindrical exterior shell;
heating coils located between the cylindrical, stainless steel interior shell and the insulation material;
a fill port on an upper portion of the cylindrical exterior shell that connects to the inner cavity of the cylindrical, stainless steel interior shell and is configure to receive food waste;
an evacuation drain on a lower portion of the cylindrical exterior shell that connects to the inner cavity of the cylindrical, stainless steel interior shell and is configured to collect and expel moisture and water from the food waste;
a vent on the upper portion of the cylindrical exterior shell that connects to the inner cavity of the cylindrical, stainless steel interior shell and is configured to vent moisture from the food waste;
an evacuation port that connects to the inner cavity of the cylindrical, stainless steel interior shell;
a fan;
an auger located in the inner cavity of the cylindrical, stainless steel interior shell; and
an energy source configured to activate the heating coils;
wherein:
the device is configured to removably mount on a platform through the use of the metal frame; and
the device is removable from the platform using a roll-off feature.

19. A method of dehydrating food waste, the method comprising:
inserting food waste into a food waste dehydrator comprised of:
a metal frame;
a cylindrical exterior shell;
a cylindrical interior shell forming an inner cavity;
insulation material located between the cylindrical interior shell and the cylindrical exterior shell;
heating coils located between the cylindrical interior shell and the insulation material;
a fill port on an upper portion of the cylindrical exterior shell that connects to the inner cavity of the cylindrical interior shell and is configure to receive food waste;
an evacuation drain on a lower portion of the cylindrical exterior shell that connects to the inner cavity of the cylindrical interior shell and is configured to collect and expel moisture and water from the food waste;
a vent on the upper portion of the cylindrical exterior shell that connects to the inner cavity of the cylindrical interior shell and is configured to vent moisture from the food waste;
an evacuation port that connects to the inner cavity of the cylindrical interior shell;
a fan; and
an auger located in the inner cavity of the cylindrical interior shell;
dehydrating the food waste until the food waste reaches a predetermined moisture level;
removing the dehydrated food waste through the evacuation port; and
storing the dehydrated food waste;
wherein the food waste is capable of retaining the predetermined moisture level to be used as animal feed.

* * * * *

UNITED STATES PATENT AND TRADEMARK OFFICE
CERTIFICATE OF CORRECTION

| | | |
|---|---|---|
| PATENT NO. | : 9,615,604 B2 | |
| APPLICATION NO. | : 14/515264 | |
| DATED | : April 11, 2017 | |
| INVENTOR(S) | : David Russick et al. | |

It is certified that error appears in the above-identified patent and that said Letters Patent is hereby corrected as shown below:

In the Specification

Column 1, Line 61 should read as follows:
--FIG. 1 is a right side view...--

Column 5, Line 36 should read as follows:
--...from those establishments, or it can...--

Column 7, Line 5 should read as follows:
--...wide, and the sidewall...--

Column 7, Line 24 should read as follows:
--...midline, and one line of holes...--

Column 7, Line 46 should read as follows:
--...mount parts, and FIGS. 23 and 24...--

Column 8, Line 14 should read as follows:
--...ports, and the inner single...--

Column 8, Line 16 should read as follows:
--...intake ports, and the inner...--

Figure 29:
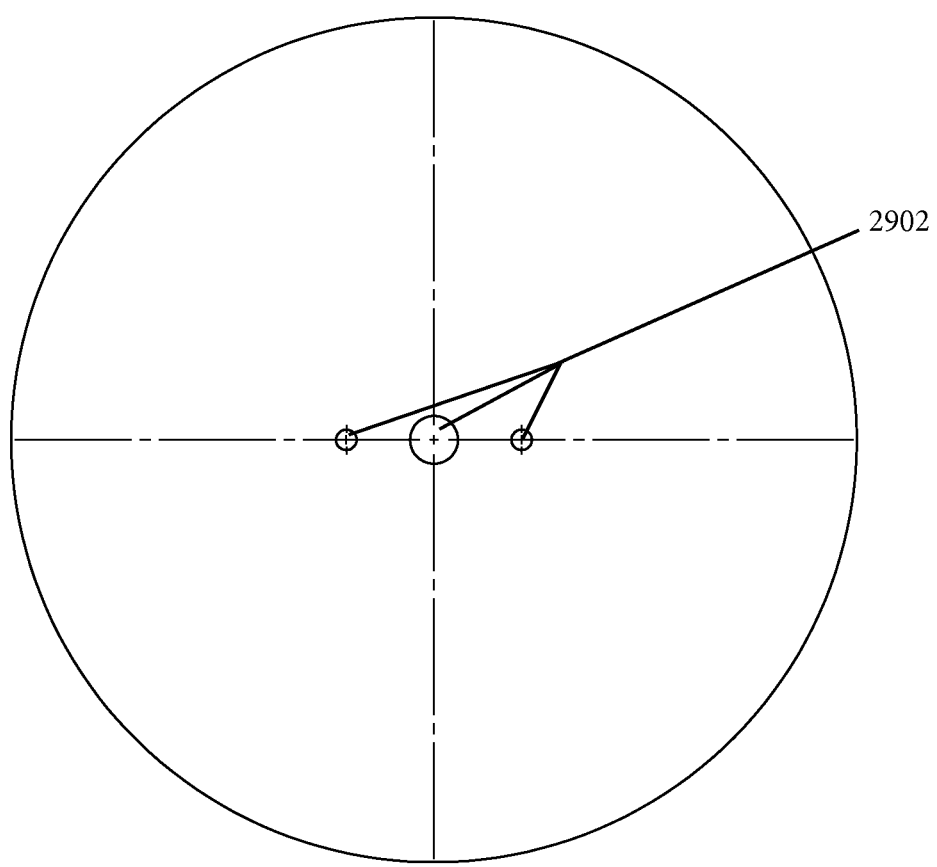
FIG. 29 illustrates the rear disc of the disclosed dehydrator of FIG. 4.

Column 8, Line 20 should read as follows:
--...2900, as illustrated in FIG. 29. The rear disk...--

In the Claims

Column 9, Line 4 should read as follows:
--...through the use of the frame.--

Signed and Sealed this
Fourteenth Day of November, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,615,604 B2

Column 9, Line 56 should read as follows:
--...and is configured to receive...--

Column 10, Line 33 should read as follows:
--...and is configured to receive...--